US012574202B2

(12) United States Patent
Zhandry

(10) Patent No.: US 12,574,202 B2
(45) Date of Patent: Mar. 10, 2026

(54) ENHANCED SYSTEMS AND METHODS FOR PIRATE DECODER IDENTIFICATION

(71) Applicant: NTT Research, Inc., Sunnyvale, CA (US)

(72) Inventor: Mark Zhandry, San Francisco, CA (US)

(73) Assignee: NTT Research, Inc., Sunnyvale, CA (US)

( * ) Notice: Subject to any disclaimer, the term of this patent is extended or adjusted under 35 U.S.C. 154(b) by 127 days.

(21) Appl. No.: 18/652,421

(22) Filed: May 1, 2024

(65) Prior Publication Data

US 2024/0372696 A1 Nov. 7, 2024

Related U.S. Application Data

(60) Provisional application No. 63/499,259, filed on May 1, 2023.

(51) Int. Cl.
*H04L 9/00* (2022.01)
*H04L 9/08* (2006.01)

(52) U.S. Cl.
CPC ............ *H04L 9/002* (2013.01); *H04L 9/0858* (2013.01)

(58) Field of Classification Search
CPC .................. H04L 9/002; H04L 9/0858; H04L 2209/606
See application file for complete search history.

(56) References Cited

U.S. PATENT DOCUMENTS

| | | | | |
|---|---|---|---|---|
| 7,505,593 B2 * | 3/2009 | Jin | ................... | G11B 20/00224 380/278 |
| 7,568,094 B2 * | 7/2009 | Matsushita | ........ | H04N 21/2585 726/30 |
| 7,936,882 B2 * | 5/2011 | Junod | ..................... | H04L 9/304 380/277 |
| 8,280,051 B2 * | 10/2012 | Malcolm | ............... | G06T 1/0064 380/37 |
| 8,824,685 B2 * | 9/2014 | Candelore | ........ | H04N 21/26606 380/278 |
| 9,015,850 B2 * | 4/2015 | Kiayias | .............. | H04N 21/2585 726/26 |
| 9,294,273 B2 * | 3/2016 | Delerablee | .............. | H04L 9/088 |
| 9,866,377 B2 * | 1/2018 | Jin | ........................ | H04L 9/0836 |

(Continued)

OTHER PUBLICATIONS

Zhandry, Mark; "White Box Traitor Tracing", 2021, Springer, pp. 1-33 (Year: 2021).*

(Continued)

*Primary Examiner* — Matthew Smithers
(74) *Attorney, Agent, or Firm* — CipherLaw

(57) ABSTRACT

The disclosed technology relates to a method and system for detecting pirated decryption keys. The method involves the use of a computer tracer apparatus, comprising a translator algorithm and a query generator algorithm. The translator algorithm receives a decoder program and generates responses to queries based on a set of rules, including a state repair procedure. The query generator algorithm generates an initial and subsequent sets of queries based on inputs from the translator algorithm. The final output identifies potential traitor users. The system is executed on a quantum computer and includes modules configured for the same operations.

18 Claims, 5 Drawing Sheets

(56)  References Cited

U.S. PATENT DOCUMENTS

| | | | | |
|---|---|---|---|---|
| 2005/0273862 A1* | 12/2005 | Benaloh | H04L 9/0825 | |
| 2007/0067242 A1* | 3/2007 | Lotspiech | H04N 21/42646 | 705/57 |
| 2007/0217612 A1* | 9/2007 | So | H04L 9/065 | 380/277 |
| 2008/0285796 A1* | 11/2008 | Wendt | H04N 1/32149 | 382/100 |
| 2009/0097659 A1* | 4/2009 | Candelore | H04L 9/0822 | 380/278 |
| 2012/0060223 A1* | 3/2012 | Jin | G06F 21/105 | 726/26 |
| 2017/0012949 A1* | 1/2017 | Boren | H04L 63/045 | |
| 2023/0244663 A1* | 8/2023 | Chandroliya | G06N 5/01 | 707/713 |

OTHER PUBLICATIONS

Aaronson et al; "New Approaches for Quantum Copy-Protection", 2020, Springer, pp. 1-41. (Year: 2020).*

Goyal et al.; "New Approaches to Traitor Tracing with Embedded Identities", 2019, Springer, pp. 1-67. (Year: 2019).*

Phan, Duong; "Some Advances in Broadcast Encryption and Traitor Tracing", 2014, Cryptography and Security, pp. 1-291. (Year: 2014).*

Wu et al.; "A Multi-key Pirate Decoder against Traitor Tracing Schemes", 2010, Journal of Computer Science and Technology, pp. 362-374. (Year: 2010).*

* cited by examiner

300

MEMORY
304

PROCESSOR
302

INPUT/OUTPUT
CIRCUITRY
306

COMMUNICATIONS
CIRCUITRY
308

QUBIT
POSITIONING
CIRCUITRY
310

Computer System 500

ENHANCED SYSTEMS AND METHODS FOR PIRATE DECODER IDENTIFICATION

CROSS-REFERENCE TO RELATED APPLICATION

This application claims the benefit of U.S. Provisional Application Ser. No. 63/499,259 filed May 1, 2023, the content of which is incorporated by reference herein in its entirety.

FIELD OF THE INVENTION

The present disclosure generally relates to the field of tracers for detecting if a decoder device is executing a pirated copy of a decryption key acquired from one or more traitor users.

BACKGROUND OF THE INVENTION

The threat of quantum computers requires re-evaluation of some of the core aspects of modern cryptography. Due to Shor's algorithm, cryptosystems based on factoring or discrete logs will be insecure. Even for cryptosystems based on so-called "post-quantum" building blocks, quantum computing may also yield new threat models, such as superposition attacks.

A perhaps more subtle issue is the following: even if the building blocks are quantum-immune and the threat model remains the same, the classical proof may not hold quantumly. Indeed, a classical proof converts a classical adversary into a classical algorithm for some underlying hard problem, while a post-quantum proof must convert a quantum adversary into a quantum algorithm. What works for classical adversaries may not work for quantum adversaries. The canonical example of a proof technique that does not translate is rewinding, which is known to be problematic quantumly due to the no-cloning theorem. (A different example is the quantum random oracle model, though this model is conceptually closer to the superposition attacks mentioned above.) Rewinding is most often discussed in the context of interactive proofs, where it is used to extract information from the adversary that would remain hidden against straight-line procedures. In this context, a number of positive results have been achieved quantumly.

There are certain cases where rewinding arises, perhaps implicitly, in settings other than interactive proofs:

It is known, classically, that indistinguishability obfuscation (iO) implies differing inputs obufscation (diO) in the setting where the pairs of circuits being considered only differ on polynomially many points. The proof extracts a differing input from a distinguisher by testing the distinguisher on a variety of distributions over programs, using a type of binary search.

In traitor tracing, a coalition of malicious users group their secret keys into a pirate decoder program, and a tracing algorithm must identify at least one malicious user. Once identified, the malicious user(s) can be prosecuted. Essentially all traitor tracing schemes test the decoder on various distributions over ciphertexts, and use the corresponding decryption probabilities to accuse a user.

The unifying feature of both classes of results is that the extracted information is computed based on the success probabilities of a single adversary on various distributions of inputs. This is very different from the way information is typically extracted for interactive proofs, where the information is usually extracted from the adversary's outputs themselves.

When moving to the quantum setting for traitor tracing, Zhandry shows that if the pirate decoder contains a quantum state, then the classical tracing algorithms are no longer guaranteed to work. The malicious users of course want to design their decoder in such a way as to avoid tracing, and would therefore be incentivized to design a quantum state decoder to evade tracing. Being able to trace such quantum state decoders is therefore the natural model to consider in the post-quantum setting. Zhandry provides an initial positive result, showing how to trace even quantum decoders for schemes in the Private Linear Broadcast Encryption (PLBE) framework, when the identity space is polynomial size. (Another limitation of Zhandry's work is that the PLBE must support public encryption for all distributions used during tracing, which is not true of the known succinct LWE-based scheme.) However, the techniques are incapable of handling other important traitor tracing approaches, in particular:

Traitor tracing with embedded identities, where the identity of a user is an arbitrary string, as opposed to an index in a polynomial-sized set. The first such tracing scheme is due to Nishimaki, Wichs, and Zhandry, who use the PLBE framework but with exponentially many identities. Nishimaki et al. and later work also explore other structures for achieving embedded identities.

Combinatorial traitor tracing, which achieve traitor tracing with short ciphertexts from general public key encryption, as opposed to algebraic tools.

When considering the restricted iO-diO equivalence in the quantum setting, it is most natural to consider a quantum auxiliary input, since the auxiliary input will be the adversary's state at some step in the protocol. However, the equivalence has a flavor similar to PLBE with super-polynomial identity spaces (as observed by Nishimaki et al.), and therefore is also not handled by the previous quantum techniques.

Thus, these important cases of traitor tracing and the iO-diO equivalence were previously open questions in the quantum decoder/auxiliary input setting.

BRIEF SUMMARY OF THE INVENTION

We show the following results:

The post-quantum equivalence of indisitnguishability obfuscation and differing inputs obfuscation in the restricted setting where the outputs differ on at most a polynomial number of points. Our result handles the case where the auxiliary input may contain a quantum state; previous results could only handle classical auxiliary input.

Bounded collusion traitor tracing from general public key encryption, where the decoder is allowed to contain a quantum state. The parameters of the scheme grow polynomially in the collusion bound.

Collusion-resistant traitor tracing with constant-size ciphertexts from general public key encryption, again for quantum state decoders. The public key and secret keys grow polynomially in the number of users.

Traitor tracing with embedded identities, again for quantum state decoders, under a variety of different assumptions with different parameter size trade-offs.

Traitor tracing and differing inputs obfuscation with quantum decoders/auxiliary input arises naturally when considering the post-quantum security of these primitives. We obtain our results by abstracting out a core algorithmic model, which we call the Back One Step (BOS) model. We prove a general theorem, reducing many quantum results including ours to designing classical algorithms in the BOS model. We then provide simple algorithms for the particular instances studied in this work.

This Work. In our work, we resolve these open questions. We start by defining an algorithmic model we call the Back One Step (BOS) model, which we show is valid for any quantum program containing a quantum state. This is the core conceptual contribution of this work, and builds on ideas from Zhandry and Chiesa, Ma, Spooner, and Zhandry, which in turn build on Marriott and Watrous.

We then design new algorithms for the model, for the instances arising from the aforementioned open problems. This step is entirely classical, and while the algorithms may not be trivial, they are fairly simple. Combining our results together, we achieve the following results:

We prove the restricted iO-diO equivalence holds postquantumly, even if the auxiliary input is a quantum state. Along the way, we give a definition of diO that address several subtleties in defining quantum security that we overcome.

We construct tracing algorithms for several existing traitor tracing schemes, achieving a couple "firsts" for tracing schemes for quantum decoders:

(Section 6) Bounded collision traitor tracing from general public key encryption, where the parameters grow polynomially with the collusion bound but are independent of the number of users.

(Section 6) Collusion-resistant traitor tracing from general public key encryption, where ciphertext size is independent of the number of users.

(Sections 5 and 7) Collusion-resistant embedded identity traitor tracing, under various assumptions with different parameter size trade-offs. In particular, assuming public key encryption, we get a scheme where the parameters grow polynomially in the number of users. Assuming Learning With Errors (LWE), we get such a scheme with succinct ciphertexts whose length is independent of the length of the embedded identities. Finally, assuming iO, we get a scheme with both succinct ciphertexts and where parameter sizes are independent of the number of users.

These schemes are identical to their classical counterparts, except for the tracing algorithm. They also match most of the best-known results for classical traitor tracing under post-quantum assumptions, with the main exception being the LWE-based traitor tracing scheme with constant-sized parameters, which still remains open in the quantum setting.

BRIEF DESCRIPTION OF THE DRAWINGS

Non-limiting and non-exhaustive examples are described with reference to the following figures.

DETAILED DESCRIPTION

Figure 1:
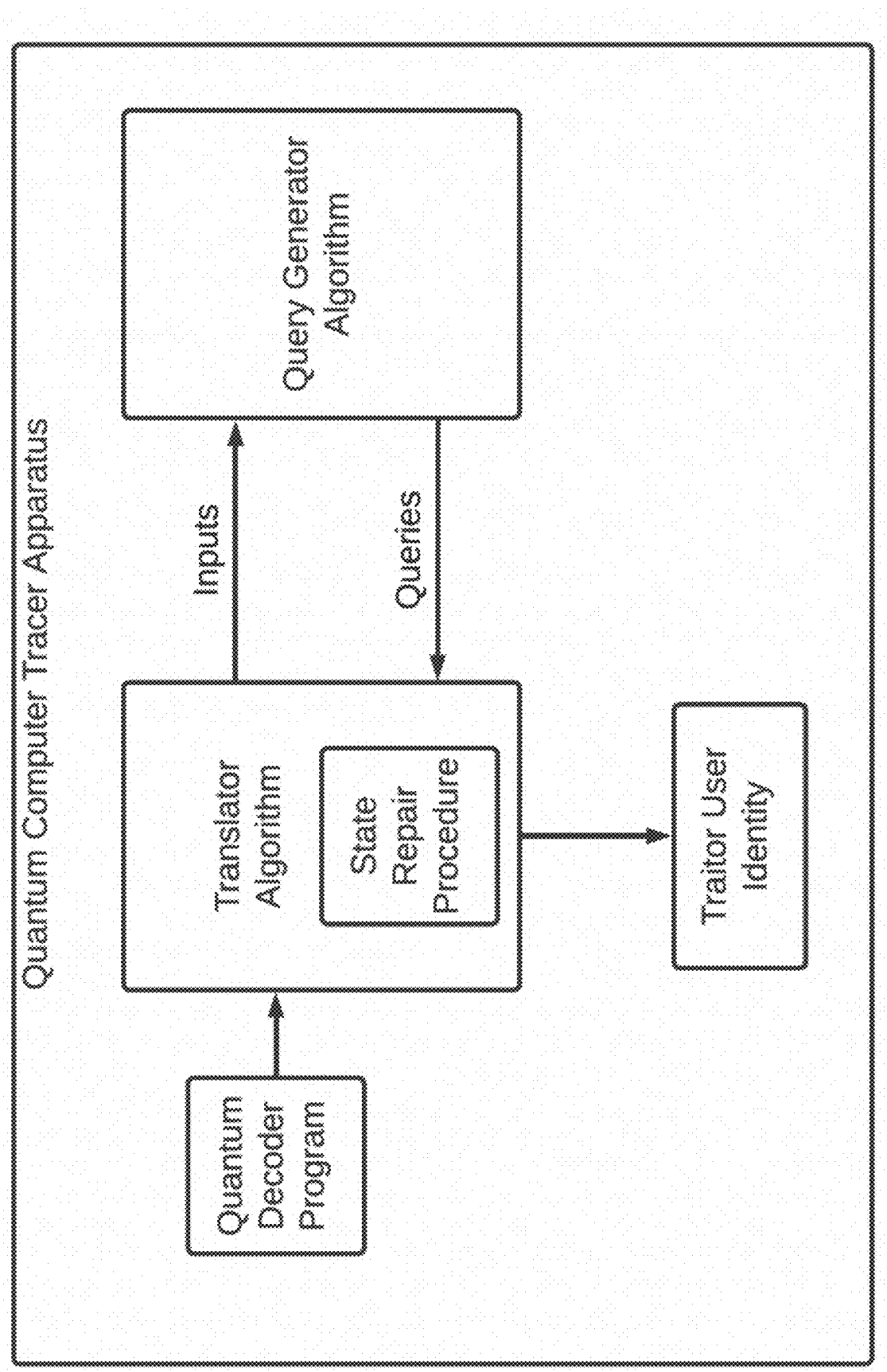
FIG. 1 illustrates a quantum computer tracer apparatus, according to aspects of the present disclosure.

The following description sets forth exemplary aspects of the present disclosure. It should be recognized, however, that such description is not intended as a limitation on the scope of the present disclosure. Rather, the description also encompasses combinations and modifications to those exemplary aspects described herein.

1 Technical Overview

1.1 a General View of Classical Tracing Algorithms

Essentially all modern classical traitor tracing algorithms can be framed as follows. There is a collection $\mathcal{D} = \{D_q\}_{q \in \mathcal{Q}}$ of distributions of ciphertexts, and the adversary produces a decoder subject to the following guarantees:

Large success probability on source. The distribution of "honest" ciphertexts is an element of $\mathcal{D}$, which we will denote as $D_\alpha$ for some distinguished $\alpha \in \mathcal{Q}$ that we call the source. Any useful decoder, by definition, has a "large" success probability on $D_\alpha$.

Small success probability on sinks. There is a collection of distributions $\{D_q\}_{q \in \Omega}$ for $q \in \Omega \subset \mathcal{Q}$, which we may call sinks, for which any coalition of users has "small" success probability.

Constant on adversary partition. Any coalition of malicious users corresponds to a partition $\Pi$ on $\mathcal{Q}$, such that the coalition, and therefore their decoder, cannot efficiently distinguish between distributions belonging to the same part of the partition. In other words, the decoder's decryption probability is roughly constant on each part of the partition.

The tracing algorithm therefore tests the decoder on various $D_q$, learning (estimates of) the decoder's success probabilities on $D_q$. The rough idea is that $\alpha$ and $q \in \Omega$ must have different success probabilities, so the tracer is guaranteed to see some jumps as it make its queries. These jumps must be across different parts of the partition, revealing some information about the structure of the partition. The hope is that this information can identify at least one malicious user.

Abstracting out the details of generating the various distributions and estimating their success probability, we arrive at a model we might call the Globally Consistent Hidden Partition model, where the tracer simply queries (potentially adaptively) on various $q_i \in \mathcal{Q}$ and receives in response real numbers $o_i \in [0, 1]$. We are guaranteed that any $o_i, o_j$ which correspond to queries $q_i, q_j$ lying in the same part of the partition $\Pi$ will be close, that $q_i = \alpha$ will give "large" $o_i$, and that $q_i \in \Omega$ will give "small" $o_i$. The tracer then takes these $o_i$ and uses them to learn information about the partition.

Example: PLBE. To make things concrete, we now illustrate how this view captures private linear broadcast encryption (PLBE). Here, there are N users, with identities $1, \ldots, N$. For any $q \in [0, N]$, one can encrypt to the set $[q] = \{1, \ldots, q\}$. Users in q will be able to decrypt, while users outside of q will not. An "honest" ciphertext is an encryption to all users, $q = N$. Moreover, any coalition of users will be unable to distinguish encryptions to [a] and [b], unless the coalition contains a user in the half-open interval (a,b]. In the view above, we would therefore have $\mathcal{Q} = [0, N]$, $\alpha = N$, and

$\Omega=\{0\}$. For a coalition of users $a_1 < a_2 < \ldots < a_t \in [N]$, the partition $\Pi$ therefore consists of the intervals $[0,a_1], (a_1,a_2], (a_2,a_3], \ldots, (a_t,N]$.

To trace, we split into two cases. In the case where N is polynomial, one simply estimates the success probabilities $o_0, o_1, \ldots, o_N$ on queries $0, 1, \ldots, N$. The usefulness of the decoder implies that $o_N \gg 0$, while PLBE security implies that $o_0 \approx 0$. Therefore, there must exist a q such that $|o_{q-1} - o_q| \gg 0$. But since $o_i$ must be constant on the intervals in $\Pi$, we know that $q=a_i$ for some i. Thus we have identified a member of the coalition.

If N is exponential, then we cannot simply do a linear scan. However, a variant of a binary search will work, as shown in Boyle, Chung, and Pass as well as Nishimaki et al. In the binary search, we recurse left if there is a large gap between the pivot and the left value, while we recurse right if there is a large gap between the pivot and the right value. Importantly, we must make sure to pivot both left and right if there is a large gap in both directions. Otherwise, there is a possibility that every time we recurse, the gap gets divided by 2, and after a polynomial number of steps the gap is negligible but we have yet to accuse a user. Fortunately, it is proved by those works that there will never be more branches in the binary search than there are users in the coalition, so the overall search still takes polynomial time.

1.2 Moving to Quantum: Prior Results

When we move to allowing a quantum decoder, we must be much more careful. There are several issues, first pointed out by Zhandry. First is definitional: the success probability of the decoder is not necessarily known (nor even knowable) until it is measured, and any measurement necessarily alters the quantum state. Care must be taken to appropriately define traitor tracing to handle cases where the decoder may be in superposition of both high success probability and low success probability. Zhandry shows how to handle these definitional issues.

The second issue has to do with rewinding, which happens at two levels. First, estimating success probability on a distribution classically involves running the decoder on various samples from the distribution. But this implicitly requires being able to return the decoder to its original state every time, to ensure independent trials from the same distribution. As mentioned above, quantumly rewinding is problematic. In particular, each trial may alter the state of the decoder. Zhandry demonstrates that the classical approach of repeated sampling cannot, in general, yield an estimate of the decoder's success probability. Fortunately, Zhandry shows how to develop a quantum-compatible success probability estimation routine based on a technique of Marriott and Watrous.

Note that Zhandry's procedure requires security to hold when the adversary gets an arbitrary polynomial number of tracing ciphertexts; this is not the case for traitor tracing from LWE. We inherit this limitation, and this is why we still cannot handle succinct traitor tracing from LWE.

A second level is that multiple success probabilities will have to be estimated, for various distributions of inputs. In the classical setting, it is assumed that each estimate of success probability is applied to the same initial decoder; in other words, the decoder is rewound to its initial state. (The usual terminology is that the decode is "stateless."). Otherwise, how can we make sense of gaps between estimated success probabilities, if the success probabilities has since changed and the previous estimates are no longer valid.

Zhandry gives a first step toward overcoming this problem, by showing that a local consistency property holds: if two consecutive estimates of success probabilities are on computationally indistinguishable distributions, then the estimated success probabilities will be close. However, estimated probabilities that are not consecutive may not obey this property. This gives rise to a variant of the tracing model above, which we will call the Locally Consistent Hidden Partition Model, that is identical to the Globally Consistent model above, except that (1) $o_i, o_j$ corresponding to $q_i, q_j$ in the same part are guaranteed close only if $|i-j| \leq 1$, and (2) $q_i = \alpha$ is guaranteed to yield a large $r_i$ only on the first query $i=1$. The good news is that the linear scan algorithm for PLBE with polynomial identity space fits within this model (provided the scan starts at N and goes to 0), allowing Zhandry to trace this particular case. On the other hand, the model seems inherently limited to PLBE: during any sequence of probability estimates, the estimate outcomes may be the sequence $1, 1, 1, \ldots, 1, 0, 0, 0, \ldots$. Such a sequence would satisfy the local consistency requirements, as long as the jump from 1 to 0 happens the first time a distribution $D_q$ for $q \in \Omega$ is tested. But for a polynomial-length sequence, only a log number of bits of information can be extracted, namely the location of the jump between 1 and 0. Thus this model is incapable of handling a variety of traitor tracing scenarios, such as Embedded identities, where the whole point is to embed more than a logarithmic amount of information.

Combinatorial traitor tracing, which usually follows a non-linear path. For example, traitor tracing based on fingerprinting codes first extracts a very long "codeword" from the decoder, which is then further processed; in the locally consistent model it would be impossible to construct this codeword.

The work of Kitagawa and Nishimaki. Kitagawa and Nishimaki show how to watermark PRFs in a quantum decoder model. Most relevant to us, their algorithm surprisingly extracts more than a logarithmic amount of information. However, their techniques are likely limited to the case of no collusions, which is insufficient for our purposes.

1.3 Our Solution: The Back One Step (BOS) Model

A starting point for our results is the recent work of Chiesa, Ma, Spooner, and Zhandry. They provide a powerful new rewinding technique, where they show that in some sense it is possible to "repair" a quantum state after a measurement. They apply their technique to the setting of interactive proofs, where they repair the quantum state of the adversary in order to rewind the it many times. In this work, we show how to adapt the rewinding technique to our setting.

Before getting into the details of our approach, we highlight some conceptual differences between our settings:

Chiesa et al. extract information from an adversary using the adversary's actual messages; the rewinds are used to obtain many such messages. The inputs for the different rewinds are typically all uniformly random and independent. In contrast, for traitor tracing, information is generally extracted by looking at success probabilities. The distributions tested will generally be far from uniform, in order to get differences in success probabilities.

The decision tree in traitor tracing is rather deep. Consider for example the binary search algorithm for PLBE with large identities. In order to find a gap, we must explore a deep branch. We may not find anything, in which case we must return to the root and explore a different branch. In contrast, the rewinding in Chiesa et al. always returns the adversary to a state approximating the initial state of the adversary. In this sense, the decision tree is shallow, having only one level.

The repair procedure can only repair a single feature of the adversary. This is inherent, since different quantities may correspond to "incompatible" observables, and in general quantum systems one cannot simultaneously "know" the values of incompatible observables. Chiesa et al. always repair just the original success probability of the adversary. This is enough for them, due to their shallow decision tree. Looking at our setting, however, always repairing to the initial setting will not work. For example, in the binary search case, if we just repair to the initial success probability, this allows us to return to the root of the binary search tree. But now the values at all points may have shifted around. So if we explore a branch and fail to find a gap, when we return to the root, the gap we are looking for may have moved into the branch we just abandoned. Even if we explore all branches, we may never end up actually finding the ever-moving gap.

In order to simplify the task of designing new tracing protocols to overcome these challenges, we propose an intermediate model which we call the Back One Step (BOS) model. The BOS model allows us to abstract away the complicated techniques of state repair in order to give a clean model of what the technique should be capable of. This model will then allow us to design novel tracing algorithms. Importantly, the task of designing algorithm in the model will be entirely classical, with all the quantum aspects hidden beneath the abstraction.

The Model. We now describe the BOS model: there is a collection $\mathcal{Q}$ of queries available. There is moreover a potentially stateful oracle which contains a secret partition $\Pi$ of $\mathcal{Q}$. The oracle accepts a sequence of queries $q_1, \ldots, q_t \in \mathcal{Q}$, and answers queries with a bit $o_i \in \{0, 1\}$. Note that we descretized the $o_i$, to make the model simpler. We impose the following constraints:

Large value on source if first query. A distinguished query $\alpha \in \mathcal{Q}$. If $q_1 = \alpha$, then $o_1 = 1$. There are no guarantees on subsequent queries to $\alpha$, or if $\alpha$ is not the very first query.

Small values on sinks. There is a collection $\Omega \subset \mathcal{Q}$, such that if $q_i \in \Omega$, then $o_i = 0$. This holds for all i.

Local consistency. For any two consecutive queries $q_i$, $q_{i+1}$, if $q_i$, $q_{i+1}$ lie in the same part of the partition $\Pi$ (and in particular, if $q_i = q_{i+1}$), then $o_i = o_{i+1}$. There is no such requirement for $q_i, q_j$ with $|i-j| > 1$.

Single step rewinding. Finally, if $q_{i+2} = q_i$, then $o_{i+2} = o_i$. Any other identical queries that may exist in the query sequence have no such restriction.

If we ignore the last requirement, note that we recover the model of Zhandry. The last requirement essentially says that we can make a query $q_i$, make an arbitrary different query $q_{i+1}$, and then rewind to the previous query $q_i$ for query i+2 and be guaranteed to recover the same output $o_i$ a second time.

Realizing the BOS Model. By adapting the rewinding technique of Chiesa et al., we show how to instantiate a BOS oracle from any pirate decoder or diO adversary. The rough idea is to run the BOS algorithm, using Zhandry's success probability estimation routine to answer every query. This already ensures large values on the source (if the first query), small values on the sinks, and local consistency, following the same analysis as Zhandry. In order to ensure single step rewinding, we then add one more feature: if any query $q_{i+2}$ is equal to $q_i$, instead of naively computing the success probability $o_{q+2}$ using Zhandry, we instead use the quantum rewinding technique of Chiesa et al. to rewind to a state where query $q_{i+2} = q_i$ yields success probability essentially equal to $o_q$. Thus, we can answer the query with $o_{q+2} = o_q$, thereby guaranteeing single step rewinding.

Designing Algorithms for the BOS Model. The BOS oracle guarantees are much weaker than the Globally Consistent Hidden Partition Model, and as discussed above, many classical tracing algorithm crucially rely on these stronger consistency guarantees. Perhaps surprisingly, while local consistency alone does not appear enough for many tracing settings, the ability to rewind even a single step opens many doors. We design new algorithms for the BOS model for the various settings, crucially leveraging the ability to rewind a single step. Importantly, this design process is entirely classical, greatly simplifying the design task. We note that the algorithm for each result is different (aside from the iO/diO equivalence and basic embedded identity tracing scheme being the same).

We next briefly describe how the process works for tracing PLBE; for the other results see the main body of the paper.

The case of PLBE. As explained above, in the case of PLBE, we have $\mathcal{Q} = [0, N]$, $\alpha = N$, $\Omega = \{0\}$, and $\Pi = \{[0, a_1], (a_1, a_2], (a_2, a_3], \ldots, (a_\ell, N]\}$. Our goal is to recover one of the $a_i$.

We know if the first query is on $\alpha = N$, then the response is $o_N = 1$. Likewise, we know if we ever query on 0, the response is $o_0 = 0$. In the classical case, we would identify an $a_i$ via a binary search. We first assign a pivot to be N/2, and query on N/2. If the query response is $o_{N/2} = 1$, we know that at least one $a_i$ lies in the interval $[1, N/2]$, so we can recurse on the interval $[0, N/2]$. If the query response is $O_{N/2} = 0$, then we know at least one $a_i$ lies in the interval $[N/2+1, N]$, and so we can recurse on the interval $[N/2, N]$.

In the BOS model, we can try the same: after querying on N and receiving response 1, we query on N/2 and receive response $o_{N/2}$. If $o_{N/2} = 1$, we know by the rules of the BOS model that there is an $a_i$ in the interval $[1, N/2]$, and if $o_{N/2} = 0$, we know by the rules of the BOS model that there is an $a_i$ in the interval $[N/2+1, N]$. Moreover, in the case $o_{N/2} = 1$, we actually have the correct setup to recurse on $\mathcal{Q}' = [0, N/2]$ by setting $\alpha' = N/2$, $\Omega' = \{0\}$, and $\Pi'$ to be the partition of $\mathcal{Q}'$ induced by $\mathcal{Q}$. Indeed by local consistency, since the last query was on $N/2 = \alpha'$ and the response was 1, if the next query is on $\alpha'$ the response will be 1, guaranteeing a large response for the recursion. Small value on the sink, local consistency, and single step rewinding carry over as well.

On the other hand, let us see what happens if we try to recurse on $[N/2, N]$ in the case $o_{N/2} = 0$. We would naturally set $\mathcal{Q}' = [N/2, N]$, $\alpha' = N$, $\Omega = \{N/2\}$. We note that local consistency and single step rewinding still carry over to this case. Moreover, since the penultimate query was on $N = \alpha'$, single step rewinding guarantees that we get a large value on $\alpha'$ if it is the next query.

This leaves small values on sink. Initially, it is true that querying on the sink N/2 gives 0, as desired. But importantly this only holds initially, where the BOS model requires the sink to give 0 always. We can see where this leads to trouble by taking the recursion a couple steps model. The next step is to query on 3N/4, receiving $o_{3N/4}$. Suppose $o_{3N/4} = 1$. Then we recuse left on the interval $\mathcal{Q}'' = [N/2, 3N/4]$ and query on 5N/8. Suppose again that $o_{5N/8} = 1$, so we recurse on the interval $[N/2, 5N/8]$. At this point, we would want that $\Omega''' = \{N/2\}$. However, our last query on N/2 was three queries ago (with 3N/4 and 5N/2 between). Therefore, $o_{N/2}$ may have changed, and there is no longer any guarantee of having small values on the sinks. Without a small value on the sinks, the recursion will fail.

One attempt to fix this problem is, after querying on 3N/4 and receiving $o_{3N/4}=1$, we insert a query on N/2. By single step rewinding, we have, as desired, that the result is $o_{N/2}=1$. However, this strategy fails when we move to the query on 5N/8. Suppose now that $o_{5N/8}=0$, meaning we recurse right on the interval $\mathcal{Q}'''=[5N/8, 3N/4]$. Unfortunately, by inserting the new query on N/2, the most recent query on 3N/4 was now three queries ago (being followed by N/2 and 5N/8). Therefore, we no longer have the guarantee that querying on the new source $\alpha'''=3N/4$ gives a 1, and in fact it could be that all future queries give a 0, which clearly does not allow for extracting any information.

We now explain our solution. If $o_{N/2}=1$, we recurse on [0, N/2] as we would classically. In the case $o_{N/2}=0$, we still query on 3N/4 to get $o_{3N/4}$. Here, if $o_{3N/4}=1$, we cannot recurse on the interval [N/2, 3N/4]. However, we can recurse on the interval $\mathcal{Q}'=[0, 3N/4]$, since now $\Omega'=\{0\}=Q$ and so we guarantee small values on sinks throughout, not just on the next query.

What if $o_{3N/4}=0$? In this case, we update the pivot to 7N/8 as if we were recursing to the right. Importantly, however, we always keep the bottom of the domain as 0 to ensure small values on the sink. So if $o_{7N/8}$ gives 1, we recurse on the interval [0, 7N/8]. If $o_{7N/8=0}$, we update the pivot to 15N/16, and so on.

With this new algorithm, we can prove that we do indeed preserve all the properties of the BOS model in each step of the recursion, and will eventually reach the case where the interval is [0, a] and the pivot is a−1, and the last two queries were on a, a−1 giving $o_a=1$, $o_{a-1}=0$. We output a, as local consistency implies that a is one of the endpoints of the intervals in Π. Moreover, we can prove termination in a polynomial number of steps, namely $O(t \log^2 N)$ where t is the number of $a_i$

2 Quantum Background

We assume basic familiarity with quantum computation. We distinguish between classical probabilistic polynomial time (PPT) algorithms and quantum polynomial time (QPT) algorithms. Sometimes we will consider programs that consist of a quantum state. Formally, these will consist of a quantum circuit C, and a quantum auxiliary input aux. To evaluate the program on input x, one evaluates C on |x⟩⊗aux. We will denote such programs by |P⟩ and the evaluation of such programs as |P⟩ (x).

Almost Projective Measurements. We state a property of general measurements due to zhandry that captures when a measurement is "close" to being projective, in the sense that sequential applications of the measurement yield similar outcomes.

A real-valued measurement $M=(M_p)_p$ is $(\epsilon, \delta)$-almost projective if applying M twice in a row to a register $\mathcal{H}$ (initially containing any state ρ) produces measurement outcomes p, p' where $\Pr[|p-p'|\le\epsilon]\ge1-\delta$.

Quantum State Repair. We now recall quantum state repair from Chiesa, Ma, Spooner, and Zhandry.

[Chiesa et al., Lemma 4.10] Given a projective measurement P on register $\mathcal{H}$ that has outcomes in set S of size N, an $(\epsilon, \delta)$-almost projective measurement M on $\mathcal{H}$, and T∈ $\mathbb{N}$, s∈ S, p∈ [0,1], there exists a procedure $\text{Repair}_{T,p,s}^{M,P}$ on $\mathcal{H}$ such that:

(State is repaired with respect to M) Consider applying the following operations to register $\mathcal{H}$ initially containing state ρ:
1. First apply M to obtain p∈ [0, 1],
2. Then apply P to obtain outcome s∈ S,
3. Then apply $\text{Repair}_{T,p,s}^{M,P}$,
4. And finally, apply M once more to obtain p'∈ [0,1].

Then $\Pr[|p-p'|>2\epsilon]\le N\delta+N/T+4\sqrt{\delta}$.

(Efficiency) The expected total number of calls that Repair makes to M and P is at most $N+4\sqrt{\delta}$.

In other words, since M is almost projective, applying M twice in a row will give outcomes p, p' that are close. However, if P is applied in between these two measurements, there are no more guarantees on the closeness of p, p'. However, by applying Repair before the second application of M, we can once again ensure closeness of p, p'.

Mixtures of Projective Measurements. The following is taken from Zhandry. We consider the following abstract setup. We have a collection $\mathcal{P}=\{\mathcal{P}_i\}_{i\in\mathcal{I}}$ of binary outcome projective measurements $\mathcal{P}_i=(P_i,Q_i)$ over the same Hilbert space $\mathcal{H}$. Here, $P_i$ corresponds to output 0, and $Q_i$ corresponds to output 1. We will assume we can efficiently measure the $\mathcal{P}_i$ for superpositions of i, meaning we can efficiently perform the following projective measurement over $\mathcal{I}\otimes\mathcal{H}$:

$$\left(\sum_i |i\rangle\langle i|\otimes P_i, \sum_i |i\rangle\langle i|\otimes Q_i\right) \tag{1}$$

Here, we call $\mathcal{H}$ a collection of projective measurements, and call $\mathcal{I}$ the control. For a distribution D over $\mathcal{I}$, let $\mathcal{H}_D$ be the POVM which samples a random i←D, applies the measurement $\mathcal{P}_i$, and outputs the resulting bit. We call $\mathcal{P}_D$ a mixture of projective measurements. The POVM is given by the matrices $(P_D,Q_D)$ where $$P = \sum_{i\in\mathcal{I}} Pr[i\leftarrow D]P_i \text{ and } Q = \sum_{i\in\mathcal{I}} Pr[i\leftarrow D]Q_i$$

Next, for a∈ $\mathbb{R}$ and interval [b,c] ⊂ $\mathbb{R}$, denote the distance between a and [b,c] as $|a-[b,c]|:=\min_{x\in[b,c]}|a-x|$. For a∈ [b, c], the distance is 0 and for a∉ [b,c], the distance is max(a−c,b−a). Let $D_0$, $D_1$ be two distributions over $\mathbb{R}$, with cumulative density functions $f_0$, $f_1$, respectively. Let $\epsilon\in\mathbb{R}$. The Shift distance with parameter $\epsilon$ is defined as:

$$\Delta_\epsilon(D_0, D_1) := \sup_{x\in\mathbb{R}} |f_0(x) - [f_1(x-\epsilon), f_1(x+\epsilon)]|$$

Let $M=(M_i)_{i\in\mathcal{I}}$ and $N=(N_j)_{j\subset\mathcal{J}}$ be real-valued quantum measurements over the same quantum system $\mathcal{H}$. The shift distance between M, N, denoted $\Delta_\epsilon(M, N)$ is defined as $$\Delta_\epsilon(M, N) := \sup_{|\psi\rangle}\Delta_\epsilon(M(|\psi\rangle), N(|\psi\rangle))$$

Now, if $\mathcal{P}_D=(P_D,Q_D)$ is a mixture of projective measurements, we note that $Q_D=I-P_D$, and therefore $P_D$, $Q_D$ commute. In this case, $\mathcal{P}_D$ has a projective implementation, denoted $\text{ProjImp}(\mathcal{P}_D)$, which is defined as follows. Let S be the set of eigenvalues of $P_D$, and $R_i$ for i the projectors onto the associated eigenspaces. Then $\text{ProjImp}(\mathcal{P}_D)$ is the projective measurement $(P_i)_{i\in S}$. Note that $S\subset[0, 1]$. Also note that applying $\mathcal{P}_D$ is equivalent to the following: first apply $\text{ProjImp}(\mathcal{P}_D)$ to obtain outcome p, then interpret p as a probability and output 1 probability p.

[Zhandry, Theorem 6.2] For any $\epsilon$, $\delta$, $\mathcal{P}$, D, there exists an algorithm $\text{API}_{\epsilon,\delta}^{\mathcal{P},D}$ operating on $\mathcal{H}$ and making quantum queries to $\mathcal{P}$, D which additionally outputs a number in some set $S\subset[0, 1]$ such that:

There is a function R=poly(1/ϵ, log(1/δ)) such that the expected number of calls $API_{\epsilon,\delta}^{\mathcal{P},D}$ makes to $\mathcal{P}$ and D, the running time of $API_{\epsilon,\delta}^{\mathcal{P},D}$, and |S| are all bounded by R.

$API_{\epsilon,\delta}^{\mathcal{P},D}$ is (ϵ, δ)-almost projective.

$\Delta_\epsilon(API_{\epsilon,\delta}^{\mathcal{P},D}, ProjImp(\mathcal{P}_D)) \leq \delta$.

[Zhandry, Theorem 6.5] Let ρ be an efficiently constructible mixed state over $\mathcal{H}$, and $D_0$, $D_1$ efficiently sampleable, computationally indistinguishable distributions. For any inverse polynomial ϵ, there exists a negligible δ such that $\Delta_\epsilon(ProjImp(\mathcal{P}_{D_0})(\rho), ProjImp(\mathcal{P}_{D_0})(\rho)) \leq \delta$.

3 Cryptographic Notions

3.1 IPP Codes

A fingerprinting code is used to fingerprint data. Fingerprinting codes have long been used to build traitor tracing schemes. Note, however, that the fingerprinting codes explicitly cited in the literature are usually binary codes. Yet, the schemes provided can be generalized to non-binary codes, but require a different kind of code called an identifiable parent property (IPP) code. We will use this generalization in order to abstract more schemes from the literature, so we here define IPP codes rather than fingerprinting codes. Note that the two notions coincide for binary codes.

An IPP code is a pair ($Gen^{IPP}$, $Trace^{IPP}$) of PPT algorithms such that:

$Gen^{IPP}(1^\lambda, 1^N, 1^c)$ takes as input a security parameter, a number of users N, and a collusion bound c. It outputs a tracing key tk, as well as N strings $w_1, \ldots, w_N \in \Sigma^\ell$. The $w_i$ are called codewords $Trace^{IPP}$(tk, w*) takes as input the tracing key and a codeword $w^* \in \Sigma^\ell$. It outputs a set $A \subset [N]$.

For a set of codewords $C \subset \Sigma^\ell$, let F(C) be the "feasible set" of C, which is defined as follows. A codeword $w \in \Sigma \cup \{?\}$ is in F(C) if, for each position $j \in [\ell]$, either $w_j^* = ?$ or there exists a codeword $w \in C$ such that $w_j^* = w_j$. In other words, F(C) consists of all codewords in C, plus all codewords that can be obtained from C by potentially using a different codeword character in each position. Additionally, any entry can be set to ?. The condition of being in the feasible set of C is also called the "marking condition".

Where IPP codes differ from fingerprinting codes is in this marking condition. For a fingerprinting code, in any position j where $\{w_j\}_{w \in C}$ is not a single character, $w_j^*$ is allowed to be anything. This condition better reflects the use in fingerprinting. However, the marketing condition for IPP codes better reflects the use in traitor tracing.

An IPP code ($Gen^{IPP}$, $Trace^{IPP}$) is δ-robust if, for all (potentially unbounded) algorithms $\mathcal{A}^{IPP}$, for all polynomially bounded N, c, and for all $S \subset [N]$, $\mathcal{A}^{IPP}$ wins the following experiment with probability at most $2^{-\lambda}$:

Run (tk, $\{w_i\}_{i \in [N]}$)←$Gen^{IPP}(1^\lambda, 1^N, 1^c)$

Run $w^* \leftarrow \mathcal{A}^{IPP}(\{w_i\}_{i \in S})$

If the number of ? in in w* is more than δℓ, output "lose" and stop.

Otherwise, run A←$Trace^{IPP}$(tk, w*)

Output "win" if (1) $w^* \in F(\{w_i\}_{i \in S})$ (w* is feasible for the set of codewords given to $\mathcal{A}^{IPP}$), and (2) either A=∅ or A⊄S.

Instantiations. In the case of binary alphabets, δ-robust IPP codes are also fingerprinting codes. Optimal fingerprinting codes with constant δ have $\ell = \Theta(c^2\lambda^2)$. In the case of non-binary alphabets, less is known about IPP codes. However, the main traitor tracing scheme of Chor, Fiat, and Naor can be seen as employing IPP codes with δ=0 and various parameters choices for $\ell$, Σ, including $\ell = \Theta(c\lambda)$, |Σ|=Θ ($c^2\lambda$).

3.2 Traitor Tracing with Quantum Decoders

We follow the definitions of traitor tracing given by Zhandry. The text is mostly taken from Zhandry, except we adjust the syntax to accommodate both ordinary and embedded-identity traitor tracing. A traitor tracing system for identity space $\mathcal{I}$ is a tuple $\Pi^{TT}$=($Gen^{TT}$, $Derive^{TT}$, $Enc^{TT}$, $Dec^{TT}$, $Trace^{TT}$) defined as follows:

$Gen^{TT}(1^\lambda)$ is a classical probabilistic polynomial time (PPT) algorithm that takes as input the security parameter, and samples a public key pk and master secret key msk.

$Derive^{TT}$(msk, id) is a classical PPT algorithm that takes as input the master secret key msk and an identity id∈ $\mathcal{I}$, and outputs a user secret key $sk_{id}$.

$Enc^{TT}$(pk, m) is a classical PPT algorithm that takes as input the public key pk and a message m, and outputs a ciphertext c.

$Dec^{TT}(sk_{id}, c)$ is a classical deterministic algorithm that takes as input a secret key $sk_{id}$ for user id and a ciphertext, and outputs a message m'.

$Trace^{TT}$(pk, $m_0$, $m_1$, $1^{1/\epsilon}$, |D⟩) is a QPT algorithm that takes as input the public key pk, two messages $m_0$, $m_1$, and a parameter ϵ (whose reciprocal is an integer represented in unary), and a quantum state |D⟩ representing a pirate decoder. It ultimately outputs a subset of $\mathcal{I}$, which are the accused users. Here, $m_0$, $m_1$ are two messages whose ciphertexts |D⟩ supposedly distinguishes, and ϵ is a supposed lower bound on the distinguishing advantage.

We next define correctness and security. A traitor tracing system $\Pi^{TT}$ is correct if, for all messages m and identities id∈ $\mathcal{I}$, $$Pr\left[Dec^{TT}(sk_{id}, Enc^{TT}(pk, m)) = m: \begin{array}{l}(pk, msk) \leftarrow Gen^{TT}(1^\lambda) \\ sk_{id} \leftarrow Derive^{TT}(msk, id)\end{array}\right] \geq$$
$$1 - negl(\lambda)$$

We now discuss security, adapting the software decoder model version of the definition of Zhandry. For a decoder |D⟩, two messages $m_0$, $m_1$, and public key pk, consider the operation on |D⟩:

Choose a random bit b←{0, 1}.

Run c←$Enc^{TT}$(pk, $m_b$) to get a random encryption of $m_b$.

Run b'←|D⟩ (c).

Output 1 if and only if b=b'; otherwise output 0.

Let $\mathcal{M}^{TT}$=($M_0$, $M_1$) be the POVM given by this operation, which we call the associated POVM to the decoder. $\mathcal{M}^{TT}$ has a projective implementation ProjImp ($\mathcal{M}^{TT}$)={$M_p'$}$_p$, where each $M_p'$ corresponds to the probability distribution on {0, 1} that is 1 with probability p.

Tracing Experiment. For an adversary $\mathcal{A}^{TT}$, function ϵ(•), and security parameter λ, we consider the following experiment on $\mathcal{A}^{\top TT}$:

Run (pk, msk)←$Gen^{TT}(1^\lambda)$, and send pk to $\mathcal{A}^{TT}$.

$\mathcal{A}^{TT}$ then makes an arbitrary number of classical queries on identities id∈ $\mathcal{I}$; in response it receives $sk_{id}$. Let S be the set of id queried by $\mathcal{A}^{\top TT}$.

Next, $\mathcal{A}^{TT}$ outputs (|D⟩, $m_0$, $m_1$) for decoder |D⟩ and messages $m_0$, $m_1$.

Apply the measurement ProjImp($\mathcal{M}^{TT}$) to $|D\rangle$, obtaining a probability p. Let $\text{Live}_\epsilon^{TT}$ be the event that $p \geq \frac{1}{2} + \epsilon$.

Finally run $A \leftarrow \text{Trace}^{TT}(pk, m_0, m_1, 1^{1/\epsilon}, |D\rangle)$ to get a set of accused users. Let $\text{Fail}_\epsilon^{TT}$ as the event that $A \not\subseteq S$ (an accused user was not one of the queried users). We define the event $\text{Success}_\epsilon^{TT}$ as the event that $A \neq \emptyset$ (some user is accused).

A tracing system is quantum traceable if for all quantum polynomial time adversaries $\mathcal{A}^{TT}$ and for every inverse polynomial $\epsilon$, there is a negligible negl such that $\Pr[\text{Fail}_\epsilon^{TT}] < \text{negl}(\lambda)$ and $\Pr[\text{Live}_\epsilon^{TT} \wedge \neg \text{Success}_\epsilon^{TT}] - \text{negl}(\lambda)$.

Variations. The usual setting of traitor tracing has I=[N] for a polynomial N. In this case, we often set N to be an explicit input to $\text{Gen}^{TT}$, and the parameters of the scheme may depend on N. A bounded collusion traitor tracing scheme additionally has another parameter c given to $\text{Gen}^{TT}$, and security only is required to hold if $|S| \leq c$. Traitor tracing with embedded identities has for $\mathcal{I} = \{0, 1\}^n$ for integer n. Therefore, identities are now polynomial-length strings. Here, n may be an input to $\text{Gen}^{TT}$ and the parameters of the scheme may depend on n. Note that some versions of embedded identity traitor tracing will have $\mathcal{I} = \{0, 1\}^*$, meaning there is no a priori bound on the length of identity strings. Finally, we consider schemes with private tracing, where $\text{Gen}^{TT}$ outputs a special tracing key tk, which is inputted into $\text{Trace}^{TT}$, and security only holds if tk is kept secret.

3.3 Defining Differing Inputs Obfuscation.

We now define differing-inputs obfuscation (diO) in the quantum setting. To the best of our knowledge, diO has not been defined in the quantum setting, and it turns out that the task is somewhat subtle. Below, we adapt the definition of traitor tracing for quantum decoders to give a strong definition of quantum-secure diO.

Let $m(\lambda)$, $n(\lambda)$, $s(\lambda)$ be polynomials, and consider a quantum polynomial time algorithm $\text{Samp}(1^\lambda)$ which samples (1) a pair of circuits $C_0$, $C_1$ of size $s(\lambda)$, input length $n(\lambda)$ and output length $m(\lambda)$, and (2) a quantum side information aux. Consider a distinguishing adversary $\mathcal{A}$. Consider the following operation on aux:

Choose a random bit $b \leftarrow \{0, 1\}$.

Run $\hat{C} \leftarrow \text{diO}(1^\lambda, C_b)$ to get an obfuscation of a random choice of $C_0$, $C_1$.

Run $b' \leftarrow \mathcal{A}(\hat{C}, C_0, C_1, \text{aux})$.

Output 1 if and only if $b'=b$; otherwise output 0.

Let $\mathcal{M}^{diO} = (M_0, M_1)$ be the POVM given by this operation, which we call the associated POVM to the sampler. $\mathcal{M}^{diO}$ has a projective implementation $\text{ProjImp}(\mathcal{M}^{diO}) = \{M_p'\}_p$, where each $M_p'$ corresponds to probability distribution on $\{0, 1\}$ that is 1 with probability p.

Now consider an extractor $\epsilon$ which takes as input $C_0$, $C_1$, aux as well as a parameter $\epsilon$ whose reciprocal is inputted in unary (so $1^{1/\epsilon}$), so that if $\epsilon$ runs in polynomial time, then it runs in time polynomial in $\lambda$ whenever $\epsilon$ is an inverse polynomial in $\lambda$. We define the following experiment, parameterized by S, $\mathcal{A}$, $\epsilon$ as well as a function $\epsilon$:

Run $(C_0, C_1, \text{aux}) \leftarrow S(1^\lambda)$. Let $\mathcal{H}$ be the register containing aux.

Apply ProjImp($\mathcal{M}^{diO}$) to $\mathcal{H}$, resulting in probability p. If $$p > \frac{1}{2} + \epsilon(\lambda),$$

we say that event $\text{Live}_\epsilon^{diO}$ happens.

Next, run $\epsilon$ on $\mathcal{H}$, obtaining an input x or symbol $\perp$. If $x \neq \perp$ but $C_0(x) = C_1(x)$, we say event $\text{Fail}_\epsilon^{diO}$ happens. If $x \neq \perp$ and $C_0(x) \neq C_1(x)$, we say event $\text{Success}_\epsilon^{diO}$ happens.

[Post-Quantum Differing-inputs Obfuscation] A post-quantum differing-inputs obfuscator (diO) is a PPT algorithm diO such that:

diO($1^\lambda$, C) is equivalent to C with overwhelming probability over the randomness of diO.

For every QPT adversary $\mathcal{A}$ and sampler S, there exists a QPT $\epsilon$ such that for every inverse polynomial function $\epsilon = \epsilon(\lambda)$, there exists a negligible negl=negl($\lambda$) such that $\Pr[\text{Fail}_\epsilon^{diO}] < \text{negl}$ and $\Pr[\text{Live}^{diO} \wedge \neg \text{Success}_\epsilon^{diO}] < \text{negl}$.

4 Hidden Partitions and the BOS Model

A partition $\Pi$ of a set T is a collection of subsets $\Pi = \{S_1, \ldots, S_n\}$ such that $T = \cup_i S_i$ and the $S_i$ are disjoint. The sets $S_i$ are called parts of $\Pi$. Given partition $\Pi = \{S_1, \ldots, S_n\}$ of T and $\Pi' = \{S_1', \ldots, S_{n'}'\}$ of T', we can define the product partition $\Pi \times \Pi'$ of $T \times T'$ as $\Pi \times \Pi' = \{S_i \times S_j\}_{(i,j) \in [n] \times [n']}$. We can similarly define the product of several partitions.

The basic setup. Fix a set $\mathcal{Q}$, $\alpha \in \mathcal{Q}$ a distinguished element, and $\Omega \subseteq \mathcal{Q}$ a distinguished subset. Also fix a relation $R(\Pi, w)$ that takes as input partitions $\Pi$ of $\mathcal{Q}$ and strings $w \in \{0, 1\}^*$ and outputs a bit. $\mathcal{Q}$ 4.1 The Quantum Hidden Partition Problem Given $\mathcal{Q}$, $\alpha$, $\Omega$, R as above, consider a QPT $S(1^\lambda)$, called a quantum hidden partition sampler (QHPS) that samples $(|P\rangle, \Pi, \mathcal{D}, \text{aux}) \leftarrow S(1^\lambda)$ such that:

$|P\rangle$ is a quantum state program taking inputs in some domain X and outputting a bit.

$\Pi$ is a partition of $\mathcal{Q}$, and $\mathcal{Q}$ $\mathcal{D}: \mathcal{Q} \to X \times \{0, 1\}$ is a PPT algorithm mapping $\mathcal{Q}$ to $X \times \{0, 1\}$.

Now consider two experiments involving a QHPS S and a quantum adversary $\mathcal{A}$. The first, called the sink indistinguishability experiment, works as follows:

First run $(|P\rangle, \Pi, \mathcal{D}) \leftarrow S(1^\lambda)$, and give $|P\rangle$ to $\mathcal{A}$.

Throughout, $\mathcal{A}$ may make classical queries to $\mathcal{D}$, sending $q \in \mathcal{Q}$, and receiving independent samples $(x, b) \leftarrow \mathcal{D}(q)$. Repeated queries on the same q will give independent samples.

Eventually $\mathcal{A}$ outputs a sink $q^* \in \Omega$. In response, run $(x^*, b^*) \leftarrow \mathcal{D}(q)$ and send $x^*$ to $\mathcal{A}$.

$\mathcal{A}$ Outputs a guess b' for b*. The experiment outputs $o = b' \oplus b^*$;

We say $\mathcal{A}$ wins the sink indistinguishability experiment if o=0 (equivalently, b'=b*).

The second experiment, called the partition indisitnguishability experiment, works as follows:

First run $(|P\rangle, \Pi, \mathcal{D}) \leftarrow S(1^\lambda)$, and give $|P\rangle$ to $\mathcal{A}$.

Throughout, $\mathcal{A}$ may make classical queries to $\mathcal{D}$, sending $q \in \mathcal{Q}$, and receiving independent samples $(x, b) \leftarrow \mathcal{D}((q)$.

Eventually $\mathcal{A}$ outputs two queries $q_0^*$, $q_1^*$. If $q_0^*$, $q_1^*$ are in the same part of $\Pi$, output a random bit o and abort. Otherwise, choose a random bit c and run $(x, b) \leftarrow \mathcal{D}(q_c^*)$ and send $(x^*, b^*)$ to $\mathcal{A}$.

$\mathcal{A}$ outputs a guess c' for c. The experiment outputs $o = c' \oplus c$; $\mathcal{A}$ wins if o=0.

We say $\mathcal{A}$ wins the partition indistinguishability experiment if o=0.

S is a valid QHPS if for any QPT adversaries, $\mathcal{A}_0$, $\mathcal{A}_1$, there exists negligible functions $negl_0$, $negl_1$ such that the probability $\mathcal{A}_0$ wins the sink indistinguishability experiment is at most $negl_0(\lambda)$, and the probability $\mathcal{A}_1$ wins the partition indistinguishability experiment is at most $negl_1(\lambda)$.

Consider the POVM which runs $(x, b) \leftarrow \mathcal{D}(\alpha)$, and run $|P\rangle(x)$ to obtain a bit b'. The POVM outputs 1 if b'=b. This POVM has a projective implementation, which we denote ProjImp($\mathcal{D}(\alpha)$). Now, consider the following experiment with algorithm $\mathcal{T}$:

First run $(|P\rangle, \Pi, \mathcal{D}) \leftarrow S(1^\lambda)$.

Next apply ProjImp($\mathcal{D}(\alpha)$) to the register $\mathcal{H}$ containing $|P\rangle$, obtaining probability p.

Run $\mathcal{T}$ on $1^{1/\epsilon}$ and $\mathcal{H}$. $\mathcal{T}$ can make queries to $\mathcal{D}$. Importantly, on query q, $\mathcal{T}$ can obtain a superposition of samples from $\mathcal{D}(q)$. The output is a string w or an abort symbol $\perp$.

Let $\mathrm{Live}_\epsilon^{BOS}$ be the event that $$p \geq \frac{1}{2} + \epsilon.$$

The event $\mathrm{Live}_\epsilon^{BOS}$ corresponds to $|P\rangle$ being able to predict the bit b with advantage at least $\epsilon$. Let $\mathrm{Success}_\epsilon^{BOS}$ be the event that $\mathcal{T}$ outputs a $w \neq \perp$ such that $R(\Pi, w)=1$, and let $\mathrm{Fail}_\epsilon^{BOS}$ be the event that $\mathcal{T}$ outputs a $w \neq \perp$ such that $R(\Pi, w)=0$.

$\mathcal{Q}$, $\alpha$, $\Omega$, R is solvable if there exists a $\mathcal{T}^{\mathcal{D}}(|P\rangle, \epsilon)$ that runs in time polynomial in $\lambda$ and $1/\epsilon$ and makes quantum queries to $\mathcal{D}$, such that for any valid QHPS S and inverse-polynomial $\epsilon$ there is a negligible negl such that $\Pr[\mathrm{Live}_\epsilon^{BOS} \wedge \neg \mathrm{Success}_\epsilon^{BOS}] \leq negl(\lambda)$ and $\Pr[\mathrm{Fail}_\epsilon^{BOS}] \leq negl(\lambda)$. In other words, $\mathcal{T}$ should almost always succeed if $|P\rangle$ starts out live, and $\mathcal{T}$ should almost never output a w that is not accepted by R (outputting $\perp$ instead if it cannot succeed).

4.2 The BOS Model

Now consider a stateful interactive potentially randomized algorithm O which takes as a secret input a partition $\Pi$, and then receives a sequence of queries $q_1, q_2, \ldots \in \mathcal{Q}$ and produces a corresponding sequence of outputs $o_1, o_2, \ldots \in \{0,1\}$. We will denote an interactive algorithm $\mathcal{A}$ interacting with O and outputting w as $w \leftarrow \mathcal{A} \leftrightarrow O(\Pi)$.

O is a BOS oracle if, for any partition $\Pi$ and any poly-length sequence of queries $q_1, q_2, \ldots, O(\Pi)$ satisfies each of the following guarantees:

Accepts first distinguished query. If $q_1 = \alpha$, then $o_1 = 1$.
Rejects sinks. For any i, if $q_i \in \Omega$, then $o_i = 0$.
Local consistency. For any two consecutive queries $q_i$, $q_{i+1}$, if $q_i, q_{i+1} \in P \in \Pi$ (that is, if $q_i, q_{i+1}$ are in the same part of the partition $\Pi$), then $o_i = o_{i+1}$.
Single step rewinding. For any i, if $q_{i+2} = q_i$, then $o_{i+2} = o_i$.
A PPT algorithm $\mathcal{A}$ solves R (with the associated $\mathcal{Q}$, $\alpha$, $\Omega$) in the BOS model if, for any BOS oracle O and any partition $\Pi$ of Q, then $\Pr[R(\Pi, w)=1 : w \leftarrow A \leftrightarrow O(\Pi)]=1$.

4.3 From BOS to Solving Quantum Hidden Partitions

Here, we present the main technical tool of this paper:
For any R, $\mathcal{Q}$, $\alpha$, R, $\Omega$, if there exists an algorithm $\mathcal{A}$ which solves R in the BOS model in polynomial time, then R, $\mathcal{Q}$, $\alpha$, $\Omega$ is solvable. We now prove Theorem 4.3. We first assume without loss of generality that $\mathcal{A}$ has the following properties:

$q_1 = \alpha$, To see why this is without loss of generality, let $\mathcal{A}$ solve R in the BOS model, and let $\mathcal{A}'$ be $\mathcal{A}$, except that if the first query is not $\alpha$, $\mathcal{A}'$ inserts a dummy query to $\alpha$ as the first query, and then ignores the response. It is easy to see that the oracle seen by $\mathcal{A}$ as a subroutine of $\mathcal{A}'$ is still a BOS algorithm, and so $\mathcal{A}'$ still solves R.

If $o_i = 0$, then $q_{i+1} = q_{i-1}$. A simple inductive argument then shows that any $o_i = 0$ is always preceded by an $o_{i-1} = 1$. To see why this is without loss of generality, let $\mathcal{A}$ solve R in the BOS model, and let $\mathcal{A}'$ be $\mathcal{A}$ except that if $o_i = 0$ and $q_{i+1} \neq q_{i-1}$, then $\mathcal{A}'$ makes a final query on $q_{i-1}$, immediately stops making queries (including not querying on $q_{i+1}$), and answers every subsequent query by $\mathcal{A}$ with 0. The oracle seen by $\mathcal{A}$ as a subroutine of $\mathcal{A}'$ is still a BOS algorithm, so $\mathcal{A}'$ still solves R. But the new $\mathcal{A}'$ will always query on $q_{i+1} = q_{i-1}$ if $o_i = 0$.

We call an $\mathcal{A}$ with the above properties normal form.

We describe the algorithm $\mathcal{T}$ given a normal form $\mathcal{A}$:
Let $\mathcal{A}$ be any normal form algorithm in the BOS model. Consider a quantum program $|P\rangle$ stored in register $\mathcal{H}$. First, define the following:

Let r be an upper bound on the number of queries made by $\mathcal{A}$.

Let $\epsilon' = \epsilon/r, \delta = 2^{-\lambda}, T = 1/\sqrt{\delta}$.

Let $\mathrm{Pred} = \{\mathrm{Pred}_x\}_x$ be the collection of projective measurements applied to $\mathcal{H}$ corresponding to running $|P\rangle$ on input x.

Let EST(q) be the algorithm $\mathrm{API}_{\epsilon'/4,\delta}^{Pred, \mathcal{D}(q)}$, where API is the algorithm in Lemma 2. We will dilate EST(q) so that it is a projective measurement. This means that EST(q) acts on register $\mathcal{H} \times \mathcal{I}_q$, where $\mathcal{I}_q$ are the anilla registers used to purify, with a different register used for every query.

We now give the algorithm $\mathcal{T}^{\mathcal{D}}(|P\rangle, 1^{1/\epsilon})$. Run $\mathcal{A}$, which makes queries $q_1, q_2, \ldots, q_r$. To answer each query $q_i$, do the following:

1. Define $p_{q_0} = \frac{1}{2} + \epsilon$.
2. If $q_i \neq q_{i-2}$:
   (a) Create the register $\mathcal{I}_{q_i}$, replacing any existing register with that name.
   (b) Then run EST($q_i$), obtaining measurement outcome $p_{q_i}$, replacing any existing value for $p_{q_i}$.
   (c) If $p_{q_i} \leq p_{q_{i-1}} - \epsilon'$, answer the query with $o_{q_i} = 0$.
   (d) If $p_{q_i} > p_{q_{i-1}} - \epsilon'$, answer the query with $o_{q_i} = 1$.
   (e) If i=1 and $o_{q_i} = 0$ (that is, this is the first query and the query response is 0) then immediately abort and output $\perp$.
3. Otherwise, if $q_i = q_{i-2}$:
   (a) Run the algorithm $$\mathrm{Repair}_{T, p_{q_{i-1}}, p_{q_{i-2}}}^{EST(q_{i-1}), EST(q_{i-2})}.$$

(b) Update $p_{q_i}$ to $P_{q_{i-2}} - \epsilon'$, and answer the query with $o_{q_i} = o_{q_{i-2}}$.

When $\mathcal{T}$ terminates and outputs w, $\mathcal{T}$ outputs w.

We now prove that $\mathcal{T}$ solves $\mathcal{Q}$, $\alpha$, $\Omega$, R. We first need the following lemma:

Suppose $\mathcal{T}$ does not abort in Step 2e. Then except with negligible probability, every query $q_i$ that $\mathcal{T}$ responds with 1 will have $p_{q_i} \geq \frac{1}{2} + \epsilon - i \times \epsilon'$. We prove by induction on i. Since $p_{q_0} = \frac{1}{2} + \epsilon$, $\mathcal{T}$ does not abort in Step 2e only if $p_{q_1} > p_{q_0} - \epsilon' = \frac{1}{2} + \epsilon - 1 \times \epsilon'$. Now we inductively assume the lemma holds for all queries before query i, and prove it holds for query i. We break into three cases:

$q_i = q_{i-2}$. In this case, $o_{q_i} = o_{q_{i-2}}$, so if $\mathcal{T}$ responds with 1, then $\mathcal{T}$ must have responded two queries ago with 1 as well. By the inductive hypothesis, this means $p_{q_{i-2}} \geq \frac{1}{2} + \epsilon - (i-2) \times \epsilon'$. But now we update $p_{q_i}$ to $p_{q_{i-2}} - \epsilon' \geq \frac{1}{2} + \epsilon - (i-1) \times \epsilon' \geq \frac{1}{2} + \epsilon - i \times \epsilon'$.

$q_i \neq q_{i-1}$, and $o_{q_{i-1}} = 1$. In this case, by induction, we have $p_{q_{i-1}} \geq \frac{1}{2} + \epsilon - (i-1) \times \epsilon'$. If $o_{q_i} = 1$, then it must be that $q_i \geq q_{i-1} - \epsilon' \geq \frac{1}{2} + \epsilon - i \times \epsilon'$.

$q_i \neq q_{i-2}$ and $o_{q_{i-1}} = 0$. By the assumption that $\mathcal{A}$ is valid, this is impossible.

This completes the proof of Lemma 4.3. We now prove the following lemma: If $\mathcal{T}$ does not abort in Step 2e, then except with negligible probability the oracle $\mathcal{T}$ presents to $\mathcal{A}$ is a BOS oracle. We prove the properties of a BOS oracle.

First distinguished query: Recall we assumed $q_1 = \alpha$. If $\mathcal{T}$ does not abort in Step 2e, then $\mathcal{T}$ responds to the query with 1.

Sinks: Consider a query $q_i \in \Omega$. We claim that $\text{EST}(q_i)$ gives measurement outcome $p_{q_i}$ that is at most $$\frac{1}{2} + \epsilon',$$

except with negligible probability. First consider replacing $\text{EST}(q_i) = \text{API}_{\epsilon'/4, \delta}^{Pred, \mathcal{D}^{(q_i)}}$ (which produces $p_{q_i}$) with ProjImp($\mathcal{D}(q_i)$), giving outcome p'. By Lemma 2, since $\Delta_{\epsilon'/4}(\text{EST}(q_i), \text{ProjImp}(\mathcal{D}(q_i))) \leq \delta$, we have $|p' - p_{q_i}| < \epsilon'/4$ except with negligible probability.

Then we note that p' must be at most $\frac{1}{2} + \text{negl} \leq \frac{1}{2} + \epsilon'/4$, except with negligible probability. Indeed, if this were not the case, then the bit b produced by $\mathcal{D}(q)$ could be predicted with non-negligible by probability. Thus we have that $$\left| p_{q_i} - \frac{1}{2} \right| \leq \epsilon'/2 \leq \epsilon'/4.$$

Now that $$p_{q_i} \leq \frac{1}{2} + \epsilon',$$

we use Lemma 4.3. If $o_{q_i} = 1$, then $p_{q_i} \geq \frac{1}{2} + \epsilon - i\epsilon' \geq \frac{1}{2} + \epsilon - r\epsilon' > \frac{1}{2} + 1\epsilon'$ since $(r+1)\epsilon' < \epsilon$, we therefore have that $o_{q_i}$ must be 0.

Local consistency: Suppose $q_i$, $q_{i+1}$ lie in the same part of $\Pi$. We claim that the measurement outcomes $p_{q_i}$ and $p_{q_{i+1}}$ satisfy $p_{q_{i+1}} \geq p_{q_i} - \epsilon'$. Indeed, consider replacing EST$(q_{i+1}) = \text{API}_{\epsilon'/4, \delta}^{Pred, \mathcal{D}^{(q_i)}}$ (which produces $p_{q_{i+1}}$) with each of the following:

$\text{EST}(q_i) = \text{API}_{\epsilon'/4, \delta}^{Pred, \mathcal{D}^{(q_i)}}$, given outcome p'. Since the last measurement on $\mathcal{H}$ was also EST$(q_i)$, by being almost projective via Lemma 2, we have $|p' - p_{q_i}| < \epsilon'/4$ except with negligible probability.

ProjImp($\mathcal{D}(q_{i+1})$), giving p''. Again by Lemma 2, since $\Delta_{\epsilon'/4}(\text{EST}(q_i), \text{ProjImp}(\mathcal{D}(q_i))) \leq \delta$, we have $|p'' - p'| < \epsilon'/4$ except with negligible probability.

ProjImp ($\mathcal{D}(q_{i+1})$), giving p'''. Since $q_i$, $q_{i+1}$ are in the same part of $\Pi$, the distributions $\mathcal{D}(q_i)$ and $\mathcal{D}(q_{i+1})$ are computationally indistinguishable. Therefore, by Lemma 2, $|p''' - p'| \leq \epsilon'/4$ except with negligible probability.

$\text{EST}(q_{i+1})$, giving $p_{q_{i+1}}$. As above, by Lemma 2, we have $|p_{q_{i+1}} - p'''| \leq \epsilon'/4$ except with negligible probability. Putting the above inequalities together shows that $|p_{q_{i+1}} - p_{q_i}| \leq \epsilon'$ except with negligible probability.

Single-step Rewinding: If $q_i = q_{i-2}$, then Lemma 2 and the fact that EST$(q_i)$ is almost projective immediately gives us that $|p_{q_i} - p_{q_{i-2}}| \leq \epsilon'/2 \leq \epsilon'$ except with probability $N\delta + N/T + 4\sqrt{\delta} = N\delta + (N+4)\sqrt{\delta}$, which is negligible.

One issue with the above proof is that in order to actually turn a bit predictor in the sink proof or a distinguisher in the local consistency proof into algorithms for the sink and partition indistinguishability games, the adversary needs to be able to run API, which in turn needs to get superpositions of samples from $\mathcal{D}(q)$. While $\mathcal{T}$ is allowed such queries, we do not allow adversaries for the sink and partition indistinguishability games such quantum access. However, following Zhandry, we can simulate such superpositions of samples with a polynomial number of samples, thus getting an algorithm for these games which only makes classical queries. This completes the proof of Lemma 4.3.

Now suppose Live$^{BOS}$ happens. In this case, by Lemma 2, $\Delta_{\epsilon'/4}(\text{EST}(\alpha), \text{ProjImp}(\mathcal{D}(\alpha))) \leq \delta$. This means, except with negligible probability $\delta$, $p_\alpha = p_{q_1}$ will be at least $\epsilon - \epsilon'/4 \geq p_{q_0} - \epsilon'$. Thus, $\mathcal{T}$ will not abort in Step 2e. Therefore, by Lemma 4.3, $\mathcal{T}$ presents a BOS oracle to $\mathcal{A}$, meaning $\mathcal{A}$ outputs a w such that R($\Pi$, w)=1. Thus Live$_\epsilon^{BOS} \wedge \neg\text{Success}_\epsilon^{BOS}$ happens except with negligible probability.

We now turn to proving that Fail$_\epsilon^{BOS}$ happens with negligible probability. For Fail$_\epsilon^{BOS}$ to happen, we must have (1) that $\mathcal{T}$ does not abort in Step 2e, and (2) that $\mathcal{T}$ fails to output a w such that R($\Pi$,w)=1. But by Lemma 4.3, if $\mathcal{T}$ does not abort, then it presents a BOS oracle to $\mathcal{A}$ except with negligible probability, meaning R($\Pi$, w)=1. Thus Fail$_\epsilon^{BOS}$ happens with negligible probability. This completes the proof of Theorem 4.3.

5 Post-Quantum Tracing with Embedded Identities

Here, we show how to build embedded identity traitor tracing from functional encryption, specifically a special case called private linear broadcast encryption (PLBE). PLBE with polynomial index space was first formalized by Boneh, Sahai, and Waters to build ordinary traitor tracing in the classical setting, and the result was upgraded to the quantum setting by Zhandry, though only in the setting of polynomial identity spaces. Using PLBE with exponential index space to build embedded identity traitor tracing was proposed by Nishimaki, Wichs, and Zhandry for the classical setting. Here, we upgrade their result to the quantum setting.

Let $\Pi^{FE}$ be a functional encryption scheme. We construct the traitor tracing scheme $\Pi^{TT} = (\text{Gen}^{TT}, \text{Derive}^{TT}, \text{Enc}^{TT}, \text{Dec}^{TT}, \text{Trace}^{TT})$, where we define Gen$^{TT}$, Derive$^{TT}$, Enc$^{TT}$, Dec$^{TT}$ below:

$$Gen^{TT}(1^\lambda, N) = Gen^{FE}(1^\lambda)$$

$$Derive^{TT}(msk, id) = Derive^{FE}(msk, f_{id}) \text{ where } f_{id}(x, m) = \begin{cases} m & \text{if } x \geq id \\ \perp & \text{otherwise} \end{cases}$$

$$Enc^{TT}(pk, m) = Enc^{FE}(pk, (N, m))$$

$$Dec^{TT}(sk_{id}, c) = Dec^{FE}(sk_{id}, c)$$

5.1 The Hidden Partition

We use the hidden partition $\mathcal{Q}^{Bnd}$, $\alpha^{Bnd}$, $\Omega^{Bnd}$, $R^{Bnd}$. We now explain how Construction 5 leads to an instance of the quantum hidden partition problem relative to this partition. We interpret an adversary $\mathcal{A}^{TT}$ interacting in the tracing experiment as a quantum hidden partition sampler $S^{TT}$, where $|P\rangle$ is the decoder $|D\rangle$ outputted by $\mathcal{A}^{TT}$, $\Pi$ is the contiguous partition whose boundaries are the identities queried by $\mathcal{A}^{TT}$. Finally $\mathcal{D}$, on input q, encrypts $(q, m_b)$ for a random choice of b to get ciphertext c, and outputs (c, b).

Assuming $\Pi^{FE}$ is an adaptively secure FE scheme, the QHPS $S^{TT}$ is valid for $\mathcal{Q}^{Bnd}$, $\alpha^{Bnd}$, $\Omega^{Bnd}$, $R^{Bnd}$. The unique sink is 0, and note that encryptions of $(0, m)$ computationally hide m, since the only secret keys are $f_{id}$ for id>0. Thus the probability the adversary can predict b (and therefore win the sink indistinguishability experiment) is at most $\frac{1}{2}$+negl.

Next, observe that encryptions of $(q, m)$ and $(q', m)$ for $q'>q$ decrypt identically under any secret key except those for id in the interval $[q, q'-1]$. Thus, by FE security, the encryptions are indistinguishable unless the adversary has an id$\in [q, q'-1]$, meaning no efficient adversary can distinguish query responses from the same part of $\Pi$. Therefore, the probability of winning the partition indistinguishability experiment is $\frac{1}{2}$+negl.

Assuming $\Pi^{FE}$ is an adaptively secure FE scheme Construction 5 is quantum traceable. Let $\mathcal{T}(|P\rangle, 1^{1/\epsilon})$ be the algorithm guaranteed by Theorem 4.3 and the existence of $\mathcal{A}^{Bnd}$. Then set $Trace^{TT}(pk, m_0, m_1, 1^{1/\epsilon}, |D\rangle)$ to be $\mathcal{T}$ $\mathcal{D}(|D\rangle, 1^{1/\epsilon})$ where $\mathcal{D}$ is the sampler above obtained from pk, $m_0$, $m_1$. Now consider the events $Live_\epsilon^{BOS}$, $Success_\epsilon^{BOS}$, $Fail_\epsilon^{BOS}$ for the QHPS described above, and the events $Live_\epsilon^{TT}$, $Success_\epsilon^{TT}$, $Fail_\epsilon^{BOS}$ for the tracing experiment with $\Pi^{TT}$ from Construction 5. We see that the events exactly coincide; in particular $D(\alpha)$ is identical to running $Enc^{TT}(pk, m_b)$ for a random choice of b. Thus, by the guarantees of Theorem 4.3, $\Pi^{TT}$ in Construction 5 is secure.

6 Traitor Tracing from Collusion-Resistant IPP Codes

It was previously shown how to construct collusion-secure traitor tracing with constant-sized ciphertexts from binary fingerprinting codes. The scheme, described momentarily, naturally generalizes to larger alphabets (at the cost of larger ciphertexts). However, the code needed for the generalization is not a fingerprinting code, but a collusion resistant identifiable parent property (IPP) code, which has a different marking condition. It turns out that IPP codes and fingerprinting codes coincide for binary codes. But by generalizing to larger alphabets (and using IPP codes) we can abstract other existing combinatorial schemes in the literature such as Chor, Fiat, and Naor.

We now recall the scheme, which is parameterized by a parameter t.

Let $(Gen^{PK}, Enc^{PK}, Dec^{PK})$ be a public key encryption scheme and $(Gen^{IPP}, Trace^{IPP})$ a $\delta$-robust fingerprinting code. Define the following algorithms, which depend on a parameter $\sigma$ that may be a function of $\delta$, $\lambda$, $\ell$:

$Gen^{TT}(1^\lambda, 1^N, 1^c)$: Run $(tk', w_1, \ldots, w_N) \leftarrow Gen^{IPP}(1^\lambda, 1^N, 1^c)$. For $j \in [\ell]$ and $\sigma \in \Sigma$, run $(ek_{j,\sigma}, dk_{j,\sigma}) \leftarrow Gen^{PK}(\lambda)$. Output $pk=\{ek_{j,\sigma}\}_{j\in[\ell], \sigma\in\Sigma}$(the public key)

$tk=(\{dk_{j,\sigma}\}_{j\in[\ell], \sigma\in\Sigma}, tk')$ (the tracing key)

$sk_i=(\{dk_{j,w_{i,j}}\}_{j\in[\ell]}, w_i)$ for $i \in [N]$ (the secret key for user $i$)

where N is the total identity space, and c is the collision bound.

$Enc^{TT}(pk, m)$: Choose a random subset $T\subseteq[\ell]$ of size t. Let $m_j$, $j \in T$ be a t-out-of-t secret sharing of m: $m_j$ are uniform conditioned on $\oplus_{j\in T}m_j=m$. For each $j\in T$, $\sigma\in\Sigma$, compute $c_{j,\sigma}=Enc^{PK}(ek_{j,\sigma}, m_j)$. Output c=(T, $\{c_{j,\sigma}\}_{j\in T, \sigma\in\Sigma}$).

$Dec^{TT}(sk_i, c)$: For each $j\in T$, run $m_j'\leftarrow Dec^{PK}(dk_{j,w_{i,j}}, c_j w_{i,j})$. Then output $m'=\oplus_{j\in T}m_j'$.

Quantum Tracing Challenges. In the classical setting, tracing works by first extracting a codeword $w^*$ from the decoder D, and then traces $w^*$ using the fingerprinting code. The first step is accomplished roughly by replacing $c_{i,\sigma}$ with junk and seeing if D still decrypts. Based on this information, the tracer can determine if $w_i^*$ should be one of the symbols in $\Sigma$ or ?. By doing this for each $i\in[\ell]$, the tracer extracts an entire codeword $w^*$.

We can easily mimic the above strategy in the quantum setting to derive a measurement for each i which computes $w_i^*$. The problem is that the measurements for each i might be incompatible, which means that the tracing algorithm cannot apply these measurements simultaneously. If applied sequentially, it could be that after computing the first several positions, the decoder becomes dead. There is no guarantee that an entire codeword $w^*$ can be computed.

More abstractly, any tracing algorithm that works within the globally consistent hidden partition model is likely only able to extract logarithmically many bits, which is insufficient for obtaining a full codeword for the fingerprinting code.

6.1 The Hidden Partition

We will assume the alphabet $\Sigma$ is equal to [1, s]. Let $\mathcal{Q}$ Prod=[0, s]$\ell$ and $\alpha^{Prod}=s^\ell$. Let $Q_\delta^{Prod}$ be the set of vectors w where the number of 0's is more than $\delta\ell$. We call a partition $\Pi$ of $\mathcal{Q}$ valid if it is equal to a product partition $\Pi_1\times \ldots \times\Pi\ell$ where each $\Pi_i$ is a contiguous partition of [0, s].

Given a valid partition, let $(a_{i,j})_j$ for $i \in [\ell]$ the boundaries of $\Pi_i$. Let $R_\delta^{Prod}(\Pi, w)$ be the following relation:

Output 1 if $\Pi$ is not valid. $i$

Output 1 if (1) $\Pi$ is valid with boundaries $(a_{i,j})_{i,j}$, (2) for all $i\in[\ell]$, $w_i$=? or $w_i \in (a_{i,j})_j$, and (3) the number of ? in w is at most $\delta\ell$.

Output 0 in all other cases.

The first condition means that we trivially win for all non-valid $\Pi$, and can focus on the case of valid $\Pi$, where the goal is to find a string w that does not have too many ? and matches the boundaries of the product partition.

We now explain how the tracing experiment for Construction 6 leads to a QHPS relative to ($\mathcal{Q}^{Prod}$, $\alpha^{Prod}$, $\Omega_\delta^{Prod}$, $R_\delta^{Prod}$). Given an adversary $\mathcal{A}^{TT}$, we define the QHPS $S^{Prod}$ as follows: first run the tracing experiment with $\mathcal{A}^{TT}$, until $\mathcal{A}^{TT}$ outputs $(|D\rangle, m_0^*, m_1^*))$. Then set $|P\rangle =|D\rangle$. Let S be the set of id queried by $\mathcal{A}^{TT}$, and let S' be the corresponding set of codewords in the IPP code given to the users in S. Let $\Pi$ be the valid partition generated by S'.

Finally, let $\mathcal{D}(q)$ be the algorithm which does the following: choose a random subset $T\subseteq[\ell]$ of size t. Choose a random bit b, and let $m=m_b{}^*$. Then let $m_j$, $j \in T$ be a t-out-of-t secret sharing of m: $m_j$ are uniform conditioned on $\oplus_{j \in T} m_j = m$. For each $j \in T$, $\sigma \in \Sigma$, compute $$c_{j,\sigma} = \begin{cases} Enc^{PK}(ek_{j,\sigma}, m_j) & \text{if } \sigma \le q_j \\ Enc^{PK}(ek_{j,\sigma}, 0) & \text{otherwise} \end{cases}$$

Output $c=(T, \{c_{j,\sigma}\}_{j \in T, \sigma \in \Sigma})$ and b. In other words, $\mathcal{D}(q)$ outputs an encryption of a random choice of $m_b{}^*$, except that it replaces the ciphertext components $c_{j,\sigma}$ with junk (importantly, independent of b) if $q_j < \sigma$.

The QHPS then outputs $(|P\rangle, \Pi, \mathcal{D})$.

Assuming $\Pi^{PK}$ is semantically secure and either (1) $t \ge (1-\delta)\ell$ or (2)

$$\binom{(1-\delta)\ell}{t}\binom{\ell}{t}$$

is negligible, then $S^{Prod}$ is valid for $\mathcal{Q}^{Prod}$, $\alpha^{Prod}$, $\Omega^{Prod}$, $R^{Prod}$. Let $q \in \Omega^{Prod}$. Then q has strictly more than $\delta\ell$ zeros; call this set $\mathcal{Z}$. If $T \cap \mathcal{Z} \neq 0$, then the share $m_j$ inside $T \cap \mathcal{Z}$ is information-theoretically hidden given c. Since the $m_j$ form a t-out-of-t secret sharing, this means if $T \cap \mathcal{Z} \neq \emptyset$, then b is statistically hidden. Thus, to prove the sink indistinguishability problem is hard, we just need to show that $T \cap \mathcal{Z} \neq \emptyset$ with overwhelming probability. A simple combinatorial argument shows that $$Pr[T \cap \mathcal{Z} \neq \emptyset] = 1 - Pr[T \cap \mathcal{Z} \neq \emptyset] =$$

$$1 - \frac{\binom{\ell - |\mathcal{Z}|}{t}}{\binom{\ell}{t}} \ge 1 - \frac{\binom{(1-\delta)\ell - 1}{t}}{\binom{\ell}{t}} = 1 - \left(\frac{(1-\delta)\ell - t}{(1-\delta)\ell}\right)\left(\frac{\binom{(1-\delta)\ell}{t}}{\binom{\ell}{t}}\right)$$

If $t > (1-\delta)\ell$, then $$\binom{(1-\delta)\ell}{t} = 0.$$

If $t=(1-\delta)\ell$, then $(1-\delta)\ell - t = 0$. In either case, $Pr[T \cap \mathcal{Z} \neq \emptyset] = 1$. Alternatively, if $$\binom{(1-\delta)\ell}{t}\binom{\ell}{t}$$

is negligible, then $Pr[T \cap \mathcal{Z} \neq \emptyset] \ge 1 - negl$. Thus, under the conditions of Lemma 6.1, the sink indisitnguishability problem is hard.

We now turn to the partition indisitnguishability experiment. Suppose $q_1$, $q_2$ are in the same part of $\Pi$, and consider the distributions $\mathcal{D}(q_1)$ and $\mathcal{D}(q_2)$. We will argue they are indistinguishable. Toward that end, consider some $j \in [\ell]$. Since $q_1$, $q_2$ are in the same part of $\Pi$, then $q_{1,j}$ and $q_{2,j}$ are in the same part of $\Pi_j$. If we assume w log that $q_{1,j} \le q_{2,j}$, then $\Pi_i$ has no boundary in $(q_{1,j}, q_{2,j})$. Now consider a ciphertext component $c_{j,\sigma}$. If $\sigma \le q_{1,j}$, then the distributions of $c_{j,\sigma}$ under $\mathcal{D}(q_1)$ and $\mathcal{D}(q_2)$ are identical. Likewise if $\sigma > q_{2,j}$. On the other hand, for $\sigma \in (q_{1,j}, q_{2,j})$, $\mathcal{A}^{TT}$ does not have the secret key $dk_{j,\sigma}$. By the semantic security of $\Pi^{PK}$, the adversary cannot distinguish $c_{j,\sigma}$ under $\mathcal{D}(q_i)$ and $\mathcal{D}(q_2)$.

By a hybrid over all j, no efficient adversary can distinguish $\mathcal{D}(q_1)$ from $\mathcal{D}(q_2)$, proving the hardness of the partition indistinguishability experiment.

6.2 The BOS Algorithm

[BOS Algorithm $\mathcal{A}^{Prod}$] Initialize $x \in [0, s]^\ell$, and set $x = s^\ell$. Now query on x, which by definition gives 1. Then do the following for $i=1, \ldots, \ell+1$:

1. For $a=s, \ldots, 1$:
   (a) Set $x'=x$, except that $x_i'$ is set to $a-1$.
   (b) Query on $x'$, receiving response $o'$.
   (c) If $o'=0$, query on x, break the loop in Step 1, and proceed to the next iteration of the main loop over i.
   (d) Otherwise, set $x=x'$, and proceed to the next iteration of the loop over a in Step 1.
2. If the loop in Step 1 terminated with all responses $o'$ being 1, then set $x_i=0$. Then proceed to the next iteration of the main loop over $i$.

In the end, output w, which is x but with every 0 replaced by ?.

$\mathcal{A}^{Prod}$ solves ($\mathcal{Q}^{Prod}$, $\alpha^{Prod}$, $\Omega^{Prod}$, $R_s^{Prod}$) in the BOS model. We maintain the invariant that each time we exit an iteration of the main loop over i, the last query was on x and the response was 1. There are two cases:

We exited the iteration from Step 1c. But in this step we query on x, so x is the most recent query at exit. Moreover, x was queried in the last iteration of the loop over a in Step 1, and the result must have been 1 in order to proceed to this iteration. Therefore, x was queried two queries ago and resulted in response 1. By single step rewinding, the latest query on x must also give 1.

We existed the iteration from Step 2. But here the most recent query was on x', it resulted in query response 1, and in Step 1d we set $x=x'$.

We also see that if we exit the loop of Step 1 via Step 1c, then the adjacent queries x and x' resulted in different outcomes, meaning a is a boundary of $\Pi_i$.

The result is that the final x is a string where all the non-zero terms are boundaries of the respective component partition, and $x \in \Omega^{Prod}$ (since the query output was no 0), meaning the number of 0's in x is at most $\delta\ell$. Thus when we replace 0's with ?'s to get w, we have that $R^{Prod}(\Pi, w)=1$. We finally note that the number of queries $\mathcal{A}^{Prod}$ makes is at most $O(s\ell)$, which is polynomial.

Assuming $\Pi^{PK}$ is a secure PKE scheme, Construction 6 is quantum traceable.

7 Tracing Embedded Identities with Short Ciphertexts

In Construction 5 from Section 5, the string x is n bits long, where n is the bit length of identities. It is also part of the message inputted to $Enc^{FE}$ of the underlying functional encryption scheme. Therefore, the ciphertext size must grow with the bit length of identities. As observed by Nishimaki, Wichs, and Zhandry, this is not inherent to traitor tracing. They instead propose a different structure where ciphertexts may be independent of the identity length. We now recall their construction:

Let $\Pi^{FE}$ be a functional encryption scheme. We construct the traitor tracing scheme $\Pi^{TT}=(Gen^{TT}, Derive^{TT}, Enc^{TT}, Dec^{TT}, Trace^{TT})$, where we define $Gen^{TT}, Derive^{TT}, Enc^{TT}, Dec^{TT}$ below:

$Gen^{TT}(1^\lambda)=Gen^{FE}(1^\lambda)$ $Derive^{TT}(msk, id)$: choose a random $\tau \in [N]$ where $N=2^\lambda$. Then return $sk_{\tau,id} \leftarrow$ $$Derive^{FE}(msk, f_{\tau,id}) \text{ where } f_{\tau,id}(i, x, m) = \begin{bmatrix} m & \text{if } x \geq 2*\tau - id_i \\ \perp & \text{otherwise} \end{bmatrix}.$$

Note here that $x \in [0,2N]=[0,2^{\lambda+1}]$ and $i \in [n]$, so the inputs to $Enc^{TT}$ are bounded by $O(\lambda)$ bits long, independent of n. Thus if $\Pi^{FE}$ has succinct ciphertexts, so will $\Pi^{TT}$.

$Enc^{TT}(pk, m)=Enc^{FE}(pk, (1, N, m))$ $Dec^{TT}(sk_{\tau,id}, c)=Dec^{FE}(sk_{\tau,id}, c)$ Tracing. The classical ideal behind the structure above is the following: first apply the tracing algorithm for Construction 5 setting i=1. The result is that the tracing algorithm outputs $2\tau-id_1$ from some secret key. Since $id_1$ is a single bit, this reveals uniquely both $\tau$ and the first bit of the associated identity. Then, by varying i and testing on ciphertexts encrypting $(i, 2\tau-1, m)$, one can learn the rest of the bits of id. Essentially, we know if the first phase accused $2\tau-id_1$, there must be a gap in the success probabilities of the decoder on encryptions of $(1,2\tau-id_1, m)$ and $(1,2\tau-id_1-1, m)$. Call these two probabilities $p_0$ and $p_1$, respectively, which are far apart. Since the $\tau$ of various secret keys are unique whp, by the security of functional encryption, we know that the decryption probability for $(i, 2\tau-id_i, m)$ must be close to $p_0$, and the decryption probability for $(i, 2\tau-id_i-1, m)$ must be close to $p_1$. Put another way, the decryption probability for $(i, 2\tau-1, m)$ will be close to $p_{1-id_i}$, thus revealing $id_i$.

Quantumly, we can employ the same strategy to recover $\tau$, $id_1$. However, recovering the rest of the bits of id will not work as in the classical case. This is because the probabilities $p_0$, $p_1$ may change as we further interrogate the decoder, so we cannot simply compare with the previous value. We therefore need to develop a new quantum algorithm for the problem.

7.1 The Hidden Partition

Let $Q^{Short}=[n]\times[0,2N]$ where $N=2^\lambda$. Let $\alpha^{Short}=(1,2N)$. Let $\Omega^{Short}=\{(i,0)\}$. Consider a sequence $(\tau^{(1)}, id^{(1)}), \ldots, (\tau^{(t)}, id^{(t)})$ where $id^{(t)} \in \{0, 1\}^*$ and $\tau^{(j)} \in [N]$ with $\tau^{(1)}<\tau^{(2)}< \ldots <\tau^{(t)}$. This gives rise to a partition $\Pi=\{S_0, \ldots, S_t\}$ of $Q^{Short}$ consisting of sets $S_j=\{(i,x):2\tau^{(j)}id_i^{(j)}\leq x<2\tau^{(j+1)}-id_i^{(j+1)}\}$ for $j=1, \ldots, t-1$, $S_0=\{(i,x): x<2\tau^{(1)}-id_i^{(1)}\}$, and $S_t=\{(i,x):2\tau^{(t)}-id_i^{(t)}\leq x\}$. We call $\Pi$ of this form contiguous, and we call $(\tau^{(j)}, id^{(j)})$ the boundaries of $\Pi$. Let $R^{Short}(\Pi, w)$ be the following relation:

Output 1 if $\Pi$ is not valid

Output 1 if $\Pi$ is valid, and w is a boundary of $\Pi$.

Output 0 if $\Pi$ is valid but w is not a boundary of $\Pi$.

We now explain how Construction 7 leads to the quantum hidden partition problem relative to this partition. We interpret an adversary $\mathcal{A}^{TT}$ interacting in the tracing experiment as a quantum hidden partition sampler $S^{TT}$, where $|P\rangle$ is the decoder $|D\rangle$ outputted by $\mathcal{A}^{TT}$, $\Pi$ is the contiguous partition whose boundaries are the identities queried by $\mathcal{A}^{TT}$.

Finally $\mathcal{D}$, on input (i, q), encrypts $((i, q), m_b)$ for a random choice of b to get ciphertext c, and outputs (c, b).

Assuming $\Pi^{FE}$ is a secure FE scheme, the QHPS is valid for $Q^{Short}, \alpha^{Short}, \Omega^{Short}, R^{Short}$ The sinks have the form (i, 0), and note that encryptions of ((i, 0), m) computationally hide m, since the only secret keys are $f_{id}$ for id>0. Thus the probability the adversary can predict b (and therefore win the sink indistinguishability experiment) is at most ½+negl.

Next, observe that encryptions of ((i, q), m) and ((i', q'), m) decrypt identically if (i, q) and (i', q') are in the same part of H. Thus, by FE security, the encryptions are indistinguishable if they lie in the same part. Therefore, the probability of winning the partition indistinguishability experiment is ½+negl.

7.2 The BOS Algorithm

[BOS Algorithm $\mathcal{A}^{Short}$] Initialize integers a, $b \in [0, 2N]$ and $i \in [n]$. Set a=2N, b=0, and query on (1, a), which by definition gives response o=1. Then do the following for at most $O(kn \log^2 N)$ steps, where k in an upper bound on the number of parts in $\Pi$.

1. Query on (1, b), obtaining response o.
2. If o=1, set (a, b)=(b,0) and go to Step 1.
3. Else (o=0):
   (a) If $b\neq(a-1)$: Query on (1,a), set $b=\lfloor(a+b)/2\rfloor$ (a remains unchanged), and go to Step 1.
   (b) Else (b=a-1): Query on (1, a), parse a as $2\tau-id_1$, and do the following for i=2, . . . , n:
       i. Query on (i, 2$\tau$-1), receiving response o.
       ii. If o=0, query on (1, a), set $id_i=0$, and proceed to the next i.
       iii. Else (o=1):
            A. Query on (i, 2$\tau$-2), receiving response d.
            B. If o'=0, set $id_i=1$, query on (i, 2$\tau$-1) and then (1, a) and proceed to the next i.
            C. Else (o'=1), set (a, b)=(a-1, 0), clear $\tau$, id, exit the loop over i in Step 3b, and go to Step 1.
       If the loop over i in Step 3b completes (that is, if we never have o'=1), output ($\tau$, id).

$\mathcal{A}^{Short}$ solves $(Q^{Short}, \alpha^{Short}, \Omega^{Short}, R^{Short})$ in the BOS model. We will eventually find a, b=a-1 where the previous query was on (1, a-1) and gave 0, and the query before was on (1,a) and gave 1. This is Step 3b. By local consistency, $a=2\tau-id_1$ for some ($\tau$, id) that defined the partition. We then query on (1, a) again, which by single step rewinding gives 1.

It remains to show that id is obtained in its entirety. This is done by trying to ascertain if (i, 2$\tau$-1) lies in the same part as (1, a) or (1, a-1). This is done by querying on (i,2$\tau$-1). If the result is 0 (Step 3(b)ii), we know by local consistency (and the fact that the last query was on (1, a) and gave 1) that (i, 2$\tau$-1) cannot be in the same part as (1, a). So we set $id_i=0$ and move on to the next bit of id. In order to guarantee that the last query response was 1, we query again on (1, a), which, by single-step rewinding will give 1.

If o=1, we do not immediately learn which part (i, 2$\tau$-1) is in. So we also query on (i, 2$\tau$-2) to get response o' (Step 3(b)iiiA). If the response is now 0, we know that (i,2$\tau$-1) and (i, 2$\tau$-2) are in different parts, meaning (i, 2$\tau$-1) is in the same part as (1, a). Thus we set $id_i=1$ and move on to the next bit of id (Step 3(b)iiiB). But first we query again on (i, 2$\tau$-1), which by single-step rewinding gives 1. Then we query on (1, a), which gives 1 by local consistency.

If on the other hand the response o' is once again 1, then we learn nothing about $id_i$. However, in this case, we have exactly the setup of a new hidden partition with N=$\tau$-1. In particular, we know there must be a ($\tau'$, id') with $\tau'<\tau$. We therefore proceed back to Step 1 but with the new N=$\tau$-1. A simple inductive argument shows that we will eventually find such a ($\tau'$, id'). This completes the proof.

Assuming FE, Construction 7 is quantum traceable. Let $\mathcal{T}(|P\rangle, 1^{1/\epsilon})$ be the algorithm guaranteed by Theorem 4.3 and the existence of $\mathcal{A}^{Short}$. Then set $Trace^{TT}(pk, m_0, m_1, 1^{1/\epsilon}, |D\rangle)$ to be $\mathcal{T}^{\mathcal{D}}(|D\rangle, 1^{1/\epsilon})$ where $\mathcal{D}$ is the sampler obtained from pk, $m_0$, $m_1$ described in Section 7.1. Now consider the events $\text{Live}_\epsilon^{BOS}$, $\text{Success}_\epsilon^{BOS}$, $\text{Fail}_\epsilon^{BOS}$ for the QHPS described in Section 7.1, and the events $\text{Live}_\epsilon^{TT}$, $\text{Success}_\epsilon^{TT}$, $\text{Fail}_\epsilon^{TT}$ for the tracing experiment with $\Pi^{TT}$ from Construction 7; in particular $D(\alpha)$ is identical to running $\text{Enc}^{TT}(\text{pk}, m_b)$ for a random choice of b. We see that the events exactly coincide. Thus, by the guarantees of Theorem 4.3, $\Pi^{TT}$ in Construction 7 is secure.

Example Systems and Apparatuses of the Present Disclosure Referring to FIG. 1, a block diagram of a quantum computer tracer apparatus is depicted. The diagram illustrates the flow of information between a Quantum Decoder Program, a Translator Algorithm with an embedded State Repair Procedure, and a Query Generator Algorithm, culminating in the identification of a Traitor User Identity. The Quantum Decoder Program feeds into the Translator Algorithm, which interacts with the Query Generator Algorithm by receiving inputs and sending back queries. The State Repair Procedure is a component within the Translator Algorithm that contributes to the process leading to the determination of the Traitor User Identity.

In some aspects, the Translator Algorithm and the Query Generator Algorithm may be instantiated, forming a computer tracer apparatus. The Translator Algorithm may receive a decoder program and generate responses to queries based on a set of rules, which may include a state repair procedure. In some cases, the Translator Algorithm may produce a final output based on the final output from the Query Generator Algorithm and store this as the identity of one or more traitor users.

Upon receiving a query from the Query Generator Algorithm, the Translator Algorithm may perform the state repair procedure or may not, depending on the queries received by that time. The Translator Algorithm may then respond to the query with 0 or 1 based on a computation involving the query and the decoder.

The state repair procedure may receive as input a quantum decoder as a quantum system and two quantum measurements M1, M2 whose outputs are real numbers between 0 and 1, and a threshold. The state repair procedure may modify the decoder in order to increase the value produced by M1. The state repair procedure may then alternatively apply M1, M2, M1, M2, . . . , and terminate when an application of M1 produces an output above the threshold.

In some aspects, the translator algorithm may include a probability estimation procedure. This procedure may execute based on a query, denoted as qi, and using the decoder program. The outcome of this procedure, denoted as pqi, may be a real number between 0 and 1. Based on previous outputs of the probability estimation procedure, the translator algorithm may set an output, denoted as oqi, to be either 0 or 1.

In some cases, the query generator algorithm may execute by initializing two integers, denoted as a and b, to be a value N and 0, respectively, where N is determined based on system parameters. The query generator algorithm may then produce a query, denoted as qi, which is set to b. Upon obtaining a response, denoted as o, the query generator algorithm may adjust the integers a and b based on the response. If the response o equals 1, the query generator algorithm may set a to be b and b to be 0, and then proceed to generate a new query. Otherwise, if b equals a minus 1, the query generator algorithm may output a as the final output. If b does not equal a minus 1, the query generator algorithm may produce a new query qi, set b to be the integer part of the sum of a and b divided by 2, and then proceed to generate a new query. This process may continue until a final output is produced by the query generator algorithm.

To accomplish this, the parties may use any of the computer systems, including the communications networks, described herein.

Figure 2:
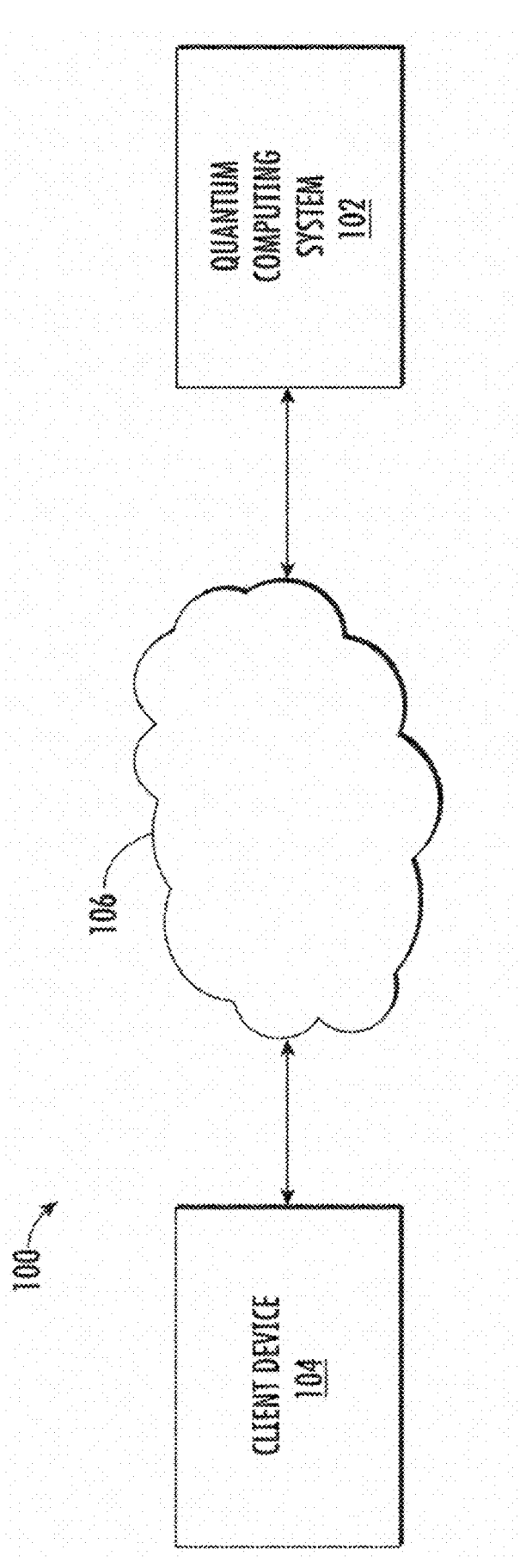
FIG. 2 depicts a system architecture for a quantum computing environment, related to FIG. 1, according to aspects of the present disclosure.

FIG. 2 illustrates a block diagram of a system that may be specially configured within which embodiments of the present disclosure may operate. Specifically, FIG. 2 depicts an example system 100. The example system 100 includes a client device 104 and a quantum computing system 102. The client device 104 and quantum computing system 102 are communicable via a communications network 106. It should be appreciated that, in other embodiments, the system 100 includes one or more additional and/or alternative devices, which may operate independently and/or communicate with other devices of the system.

In some embodiments the client device 104 embodies one or more computing devices embodied in hardware, software, firmware, and/or any combination thereof. The client device 104 may be embodied by a user device configured to provide various functionality. In this regard, the client device 104 may embody a conventional computing environment that interacts with the quantum computing system 102. Non-limiting examples of a client device 104 include a specially configured mobile device, tablet, smartphone, personal computer, laptop, enterprise terminal, and/or the like. In some embodiments, the client device 104 is configured entirely by specially configured software application(s) installed to and/or otherwise executable via the client device 104 to provide various functionality for accessing and/or otherwise controlling the quantum computing system 102 as described herein. In various embodiments, the client device 104 is a conventional and/or classical computer.

In some embodiments, the client device 104 includes specially configured hardware, software, firmware, and/or a combination thereof, that enables access to and/or configuration of the quantum computing system 102. In some embodiments, the client device 104 provides access to functionality for generating and/or retrieving a quantum program for execution via a quantum computer of the quantum computing system 102. In this regard, the client device 104 may receive one or more user input(s) for constructing and/or that otherwise embody the quantum program to be executed. In this regard, a user of the client device 104 may interact with the client device 104 to construct a quantum circuit, store the quantum circuit, and submitting the quantum circuit for execution via a quantum computing system, such as the quantum computing system 102. In some embodiments, the client device 104 is embodied by a user-facing device of the quantum computing system 102, for example such that communications can occur without requiring the communications network 106.

Alternatively or additionally, in some embodiments, the client device 104 enables user input and/or output for accessing the quantum computing system 102 to execute a quantum program. In some embodiments, the client device 104 communicates with one or more computing devices of the quantum computing system 102, such as a controller, that generates and/or compiles instructions for executing via a quantum computer. For example, in some embodiments, the quantum computing system 102 includes a controller that receives the quantum program from the client device 104 and compiles it to produce control system instructions embodying hardware manipulation instructions for running the quantum program on a specific quantum computer. In some embodiments, the controller is embodied by one or more computing devices external from but communicable with the quantum computing system 102. For example, the controller may be embodied by a circuit compiler embodied in a dedicated computing system embodied in hardware, software, firmware, and/or a combination thereof internal or external to the quantum computing environment 102, dedicated hardware communicable with a quantum computer of the quantum computing system 102, software executing on a computing system communicable with the quantum computer of the quantum computing system 102, and/or the like, The quantum computing system 102 may include one or more computing device(s) that enable compilation of a quantum program and/or use of a quantum computer for preforming a quantum program. In some embodiments, for example, the quantum computing system 102 includes a controller, a quantum computing environment, and various devices for physically manipulating the quantum computer. The quantum computing environment may include an ion trap architecture (e.g., linear, loop, and/or the like) for storing and manipulating qubits for gating. The controller may embody one or more computing device(s) embodied in hardware, software, firmware, and/or a combination thereof, that control the various devices that manipulate the quantum computer. Such control device(s) may include laser(s), cooling device(s), and/or the like. In some embodiments, the controller embodies a conventional computing system, for example specially configured via one or more specialized software application(s) to execute one or more process(es) that determine positions for the qubits at various time steps and/or instructions for repositioning the qubits to such position. For example, the controller may determine position assignments for each qubit at various time steps, and/or instructions embodying swap commands to cause the qubits to reach such positions at each of the appropriate time steps. In some embodiments, one or more device(s) of the quantum computing system 102 (e.g., a controller) receive data from the client device 104 that embodies the quantum program, instructions to be performed to manipulate the quantum computer, and/or the like.

Figure 3:
FIG. 3 shows a block diagram of a quantum computer system, expanding on the system architecture in FIG. 2, according to aspects of the present disclosure.

FIG. 3 illustrates a block diagram of an example apparatus for global qubit placement assignment that may be specially configured in accordance with at least some example embodiment of the present disclosure. In some embodiments, the controller of the quantum computing system 102 is embodied by one or more computing systems, such as the apparatus 300 as depicted and described in FIG. 3. The apparatus 300 includes processor 302, memory 304, input/output circuitry 306, communications circuitry 308, and qubit positioning circuitry 310. The apparatus 300 may be configured, using one or more of the sets of circuitry 302, 304, 306, 308, and/or 310, to execute the operations described herein.

Although components are described with respect to functional limitations, it should be understood that the particular implementations necessarily include the user of particular computing hardware. It should also be understood that certain of the components described herein may include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 300 may provide or supplement the functionality of another particular set of circuitry. For example, the processor 302 in some embodiments provides processing functionality to any of the sets of circuitry, the memory 304 provides storage functionality to any of the sets of circuitry, the communications circuitry 308 provides network interface functionality to any of the sets of circuitry, and/or the like.

In some embodiments, the processor 302 (and/or co-processor or any other processing circuitry assisting or otherwise associated with the processor) may be in communication with the memory 304 via a bus for passing information among components of the apparatus 300. In some embodiments, for example, the memory 304 is non-transitory and may include, for example, one or more volatile and/or non-volatile memories. In other words, for example, the memory 304 in some embodiments includes or embodies an electronic storage device (e.g., a computer readable storage medium). In some embodiments, the memory 304 is configured to store information, data, content, applications, instructions, or the like, for enabling the apparatus 300 to carry out various functions in accordance with example embodiments of the present disclosure.

The processor 302 may be embodied in a number of different ways. For example, in some example embodiments, the processor 302 includes one or more processing devices configured to perform independently. Additionally or alternatively, in some embodiments, the processor 302 includes one or more processor(s) configured in tandem via a bus to enable independent execution of instructions, pipelining, and/or multithreading. The use of the terms "processor" and "processing circuitry" may be understood to include a single core processor, a multi-core processor, multiple processors internal to the apparatus 300, and/or one or more remote or "cloud" processor(s) external to the apparatus 300.

In an example embodiment, the processor 302 may be configured to execute instructions stored in the memory 304 or otherwise accessible to the processor. Alternatively or additionally, the processor 302 in some embodiments is configured to execute hard-coded functionality. As such, whether configured by hardware or software methods, or by a combination thereof, the processor 302 may represent an entity (e.g., physically embodied in circuitry) capable of performing operations according to an embodiment of the present disclosure while configured accordingly. Alternatively or additionally, as another example in some example embodiments, when the processor 302 is embodied as an executor of software instructions, the instructions may specifically configure the processor 302 to perform the algorithms embodied in the specific operations described herein when such instructions are executed.

As one particular example, the processor 302 may be configured to perform various operations associated with improved traitor tracing, for example as described with respect to operation of the quantum computing system 102 and/or as described further herein.

In some embodiments, the apparatus 300 includes input/output circuitry 306 that may, in turn, be in communication with processor 302 to provide output to the user and, in some embodiments, to receive an indication of a user input. The input/output circuitry 306 may comprise one or more user interface(s) and may include a display that may comprise the interface(s) rendered as a web user interface, an application user interface, a user device, a backend system, or the like. In some embodiments, the input/output circuitry 306 may also include a keyboard, a mouse, a joystick, a touch screen, touch areas, soft keys a microphone, a speaker, or other input/output mechanisms. The processor 302 and/or input/output circuitry 306 comprising the processor may be configured to control one or more functions of one or more user interface elements through computer program instructions (e.g., software and/or firmware) stored on a memory accessible to the processor (e.g., memory 304, and/or the like). In some embodiments, the input/output circuitry 306 includes or utilizes a user-facing application to provide input/output functionality to a client device and/or other display associated with a user.

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface card(s), antenna(s), bus(es), switch(es), router(s), modem(s), and supporting hardware, firmware, and/or software, or any other device suitable for enabling communications via one or more communication network(s). Additionally or alternatively, the communications circuitry 308 may include circuitry for interacting with the antenna(s) and/or other hardware or software to cause transmission of signals via the antenna(s) or to handle receipt of signals received via the antenna(s). In some embodiments, the communications circuitry 308 enables transmission to and/or receipt of data from a client device in communication with the apparatus 300.

It should be appreciated that, in some embodiments, qubit positioning circuitry 310 may include a separate processor, specially configured field programmable gate array (FPGA), or a specially programmed application specific integrated circuit (ASIC). Additionally or alternatively, in some embodiments, one or more of the sets of circuitries 302-310 are combinable. Alternatively or additionally, in some embodiments, one or more of the sets of circuitry perform some or all of the functionality described associated with another component. For example, in some embodiments, one or more of the sets of circuitry 302-310 are combined into a single module embodied in hardware, software, firmware, and/or a combination thereof. Similarly, in some embodiments, one or more of the sets of circuitry, for example qubit positioning circuitry 310 is combined such that the processor 302 performs one or more of the operations described above with respect to each of these modules.

Figure 4:
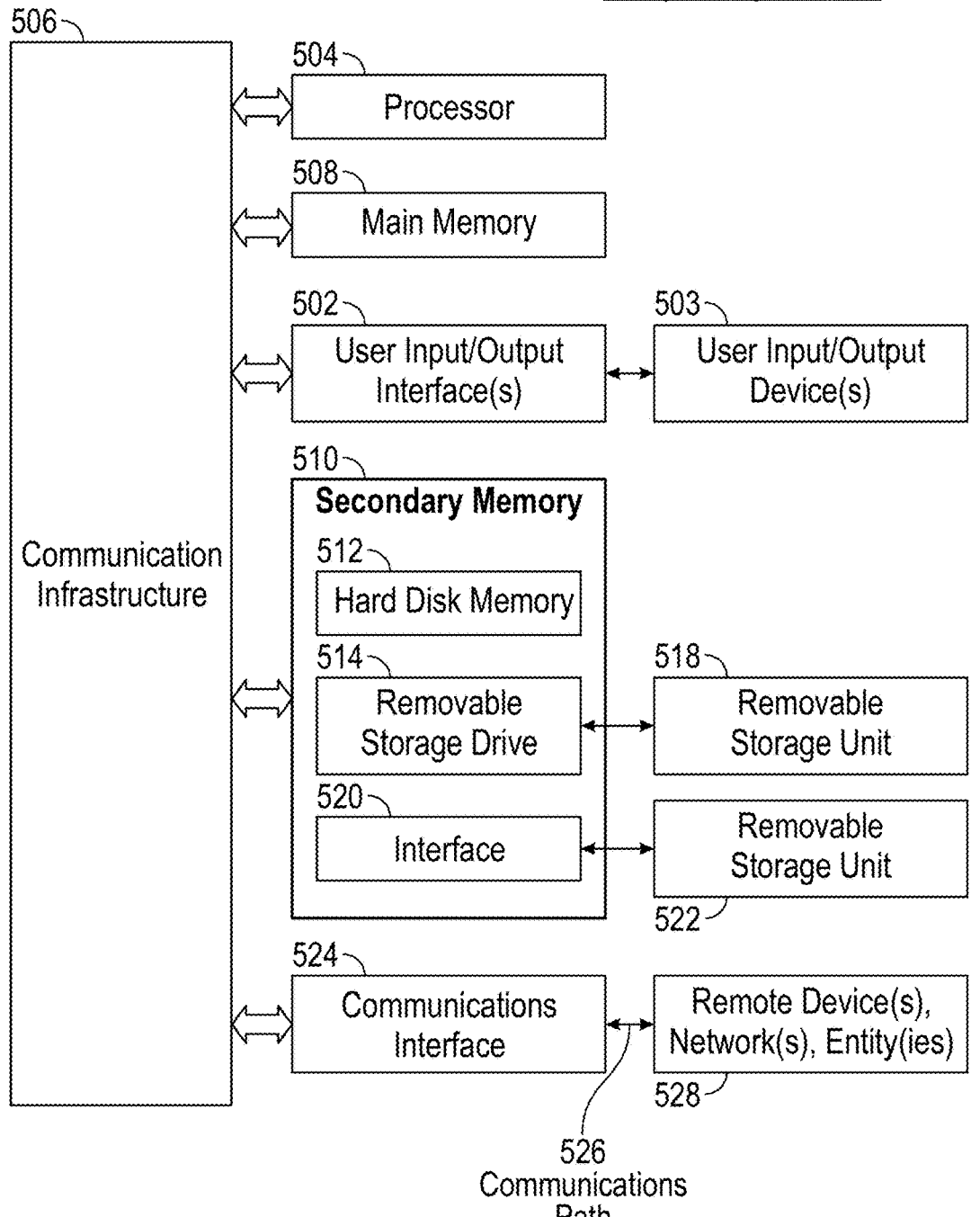
FIG. 4 and FIG. 5 both represent classical computing components that may be used in combination with or in place of the quantum systems depicted in FIGS. 1-3, according to aspects of the present disclosure.

Referring to FIG. 4, the figure illustrates classical computing components. These components may be part of a classical system, such as the client device 104 or the quantum computing system 102, as depicted in FIG. 2. The classical computing components may include various hardware and software elements that facilitate the operation of the classical system. These elements may include, but are not limited to, processors, memory units, input/output devices, and communication interfaces. In some cases, these classical computing components may execute algorithms, such as the query generator algorithm described earlier, and process data received from or sent to the quantum computing system 102. In other cases, the classical computing components may facilitate user interaction with the quantum computing system 102 or other devices or systems connected to the network cloud 106.

Figure 5:
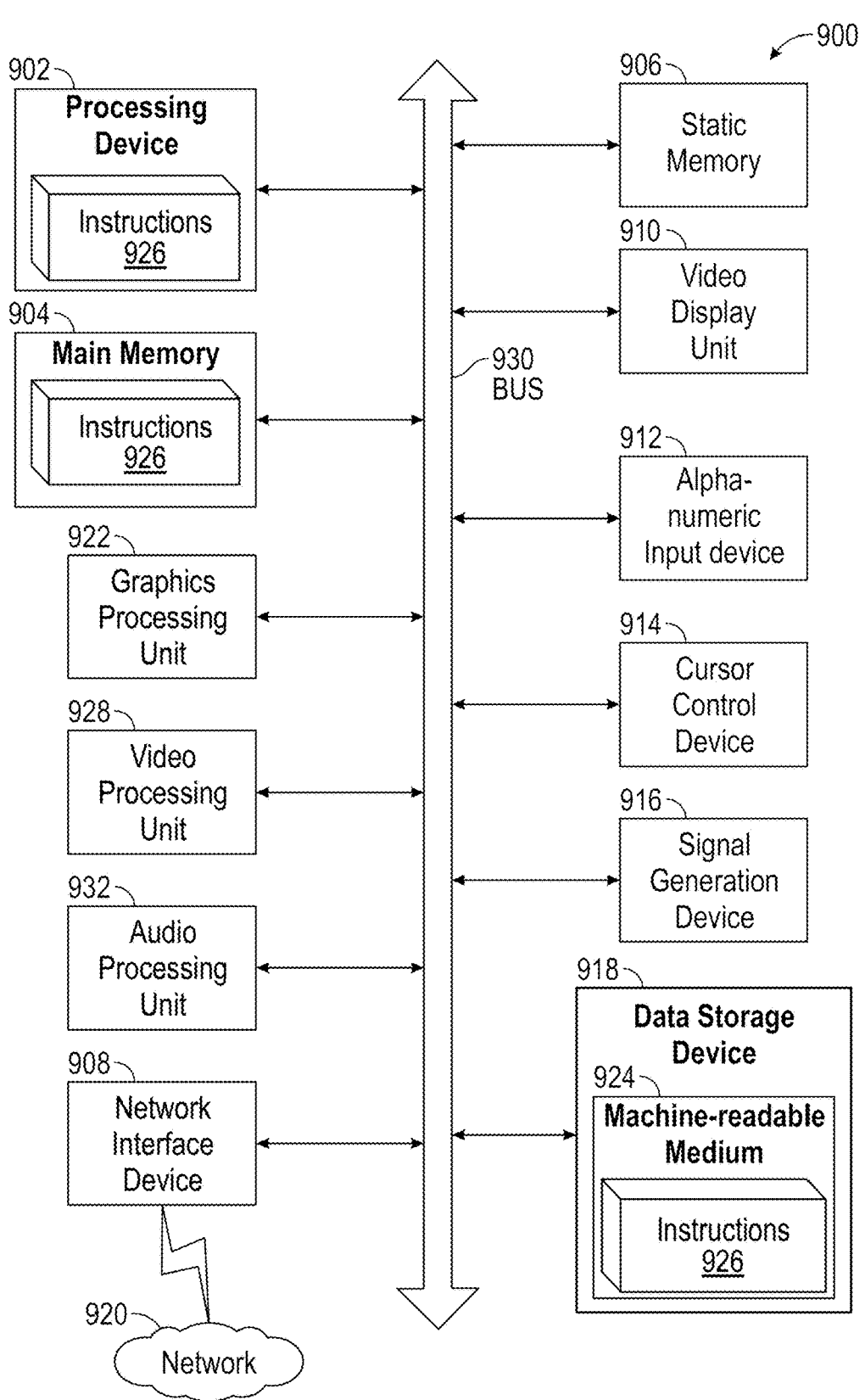

Referring now to FIG. 5, the figure illustrates additional classical computing components. These components may be part of a classical system, such as the client device 104 or the quantum computing system 102, as depicted in FIG. 2. The classical computing components may include various hardware and software elements that facilitate the operation of the classical system. These elements may include, but are not limited to, processors, memory units, input/output devices, and communication interfaces. In some cases, these classical computing components may execute algorithms, such as the query generator algorithm described earlier, and process data received from or sent to the quantum computing system 102. In other cases, the classical computing components may facilitate user interaction with the quantum computing system 102 or other devices or systems connected to the network cloud 106.

A number of implementations have been described. Nevertheless, it will be understood that various modifications may be made without departing from the spirit and scope of the disclosure. Accordingly, other implementations are within the scope of the following claims.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method executing on a computer for a tracer for detecting if a decoder device is executing a pirated copy of a decryption key acquired from one or more traitor users, the method comprising:

instantiating a translator algorithm, which in combination with a query generator algorithm, comprises a computer tracer apparatus;

instantiating the query generator algorithm, the algorithm configured for:

generating an initial set of queries, and generating subsequent sets of queries based on inputs from the translator algorithm;

generating a final output based on responses it receives from the translator algorithm;

by the translator algorithm:

receiving a decoder program;

receiving the initial set of queries $q_i$ from the query generator algorithm;

generating responses to the initial set of queries based on a set of rules comprising at least a state repair procedure;

receiving subsequent queries $q_i$ from the query generator algorithm;

generating subsequent responses to the subsequent queries;

receiving the final output from the query generator;

producing a final translator output based on the final output from the query generator; and storing the final translator output as the identity of one or more traitor users.

2. The method of claim 1, wherein the translator, upon receiving a query from the query generator: either performs the state repair procedure or does not, depending on the queries received by that time; then responding to the query with 0 or 1 based on a computation involving the query and the decoder.

3. The method of claim 1, wherein the state repair procedure:

receives as input a quantum decoder as a quantum system and two quantum measurements $M_1$, $M_2$ whose outputs are real numbers between 0 and 1, and a threshold;

modifies the decoder in order to increase the value produced by $M_1$; and then alternatively applying $M_1$, $M_2$, $M_1$, $M_2$, . . . , and terminating when an application of $M_1$ produces an output above the threshold.

4. The method of claim 1, the translator further comprising a probability estimation procedure, wherein the estimation procedure is configured for:

a. executing based on $q_i$ and using the decoder program, and b. producing an outcome that is $p_{q_i}$, which is a real number between 0 and 1, and at the translator, based on previous outputs of the probability estimation procedure, setting $o_{q_i}$ to be 0 or 1.

5. The method of claim 1, wherein the query generator executes by:

a. initializing integers a to be N and b to be 0, wherein N is determined based on system parameters;

b. producing a query $q_i$ which is set to b;

c. obtaining a response o;

d. if o=1, set a=b and b=0, then go to step b; otherwise: if b=a−1, then output a as the final output of the query generator; if b≠a−1, produce the query $q_i$ which is set to a, set b to be the integer part of (a+b)/2, and go to step b.

6. The method of claim 1, wherein the system is a quantum system comprised of qbits, and wherein the algorithm for generating queries executes on a classical system.

7. A computerized system for a tracer for detecting if a decoder device is executing a pirated copy of a decryption key acquired from one or more traitor users, the system comprising a processor configured for:

instantiating a translator algorithm, which in combination with a query generator algorithm, comprises a computer tracer apparatus;

instantiating the query generator algorithm, the algorithm configured for:

generating an initial set of queries, and generating subsequent sets of queries based on inputs from the translator algorithm;

generating a final output based on responses it receives from the translator algorithm;

by the translator algorithm:

receiving a decoder program;

receiving the initial set of queries $q_i$ from the query generator algorithm;

generating responses to the initial set of queries based on a set of rules comprising at least a state repair procedure;

receiving subsequent queries $q_i$ from the query generator algorithm;

generating subsequent responses to the subsequent queries;

receiving the final output from the query generator;

producing a final translator output based on the final output from the query generator; and storing the final translator output as the identity of one or more traitor users.

8. The system of claim 7, wherein the translator, upon receiving a query from the query generator: either performs the state repair procedure or does not, depending on the queries received by that time; then responding to the query with 0 or 1 based on a computation involving the query and the decoder.

9. The system of claim 7, wherein the state repair procedure:

receives as input a quantum decoder as a quantum system and two quantum measurements $M_1$, $M_2$ whose outputs are real numbers between 0 and 1, and a threshold;

modifies the decoder in order to increase the value produced by $M_1$; and then alternatively applying $M_1$, $M_2$, $M_1$, $M_2$, . . . , and terminating when an application of $M_1$ produces an output above the threshold.

10. The system of claim 7, the translator further comprising a probability estimation procedure, wherein the estimation procedure is configured for:

a. executing based on $q_i$ and using the decoder program, and b. producing an outcome that is $p_{q_i}$, which is a real number between 0 and 1, and at the translator, based on previous outputs of the probability estimation procedure, setting $o_{q_i}$ to be 0 or 1.

11. The system of claim 7, wherein the query generator executes by:

a. initializing integers a to be N and b to be 0, wherein N is determined based on system parameters;

b. producing a query $q_i$ which is set to b;

c. obtaining a response o;

d. if o=1, set a=b and b=0, then go to step b; otherwise: if b=a−1, then output a as the final output of the query generator; if b≠a−1, produce the query $q_i$ which is set to a, set b to be the integer part of (a+b)/2, and go to step b.

12. The system of claim 7, wherein the system is a quantum system comprised of qbits, and wherein the algorithm for generating queries executes on a classical system.

13. A non-transitory processor-readable medium storing code representing instructions to be executed by a processor at a compute device, the code further comprising commands for:

instantiating a translator algorithm, which in combination with a query generator algorithm, comprises a computer tracer apparatus;

instantiating the query generator algorithm, the algorithm configured for:

generating an initial set of queries, and generating subsequent sets of queries based on inputs from the translator algorithm;

generating a final output based on responses it receives from the translator algorithm;

by the translator algorithm:

receiving a decoder program;

receiving the initial set of queries $q_i$ from the query generator algorithm;

generating responses to the initial set of queries based on a set of rules comprising at least a state repair procedure;

receiving subsequent queries $q_i$ from the query generator algorithm;

generating subsequent responses to the subsequent queries;

receiving the final output from the query generator;

producing a final translator output based on the final output from the query generator; and storing the final translator output as the identity of one or more traitor users.

14. The media of claim 13, wherein the translator, upon receiving a query from the query generator: either performs the state repair procedure or does not, depending on the queries received by that time; then responding to the query with 0 or 1 based on a computation involving the query and the decoder.

15. The media of claim 13, wherein the state repair procedure:

receives as input a quantum decoder as a quantum system and two quantum measurements $M_1$, $M_2$ whose outputs are real numbers between 0 and 1, and a threshold;

modifies the decoder in order to increase the value produced by $M_1$; and then alternatively applying $M_1$, $M_2$, $M_1$, $M_2$, . . . , and terminating when an application of $M_1$ produces an output above the threshold.

16. The media of claim 13, the translator further comprising a probability estimation procedure, wherein the estimation procedure is configured for:

a. executing based on $q_i$ and using the decoder program, and b. producing an outcome that is $p_{q_i}$, which is a real number between 0 and 1, and at the translator, based on previous outputs of the probability estimation procedure, setting $o_{q_i}$ to be 0 or 1.

17. The media of claim 13, wherein the query generator executes by:

a. initializing integers a to be N and b to be 0, wherein N is determined based on system parameters;

b. producing a query $q_i$ which is set to b;

c. obtaining a response o;

d. if o=1, set a=b and b=0, then go to step b; otherwise: if b=a−1, then output a as the final output of the query generator; if b≠a−1, produce the query $q_i$ which is set to a, set b to be the integer part of (a+b)/2, and go to step b.

18. The media of claim 13, wherein the system is a quantum system comprised of qbits, and wherein the algorithm for generating queries executes on a classical system.

\* \* \* \* \*